United States Patent
Duncan et al.

(10) Patent No.: US 10,011,727 B2
(45) Date of Patent: Jul. 3, 2018

(54) TAILORED DISPERSION AND FORMATION OF INTEGRATED PARTICLE SYSTEMS VIA PH RESPONSIVE GROUPS

(71) Applicant: THE CHEMOURS COMPANY TT, LLC, Harrisburg, PA (US)

(72) Inventors: Andrew Jay Duncan, Wilmington, DE (US); Jelena Lasio, Bel Air, MD (US); Hau-Nan Lee, Wilmington, DE (US); Carl Andrew Menning, Newark, DE (US); Brad M Rosen, Philadelphia, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 58 days.

(21) Appl. No.: 15/120,556

(22) PCT Filed: Feb. 25, 2015

(86) PCT No.: PCT/US2015/017532
§ 371 (c)(1),
(2) Date: Aug. 22, 2016

(87) PCT Pub. No.: WO2015/138127
PCT Pub. Date: Sep. 17, 2015

(65) Prior Publication Data
US 2017/0015847 A1 Jan. 19, 2017

Related U.S. Application Data

(60) Provisional application No. 61/950,859, filed on Mar. 11, 2014.

(51) Int. Cl.
| | | |
|---|---|---|
| *C09D 7/65* | (2018.01) | |
| *C09D 7/61* | (2018.01) | |
| *C09D 7/40* | (2018.01) | |
| *C09C 1/36* | (2006.01) | |
| *C09C 3/08* | (2006.01) | |
| *C09C 1/30* | (2006.01) | |
| *C08J 3/05* | (2006.01) | |
| *C09D 133/00* | (2006.01) | |
| *C08K 9/08* | (2006.01) | |
| *C09D 5/03* | (2006.01) | |

(52) U.S. Cl.
CPC .... *C09D 7/65* (2018.01); *C08J 3/05* (2013.01); *C08K 9/08* (2013.01); *C09C 1/3063* (2013.01); *C09C 1/3669* (2013.01); *C09C 3/08* (2013.01); *C09D 5/031* (2013.01); *C09D 7/61* (2018.01); *C09D 7/70* (2018.01); *C09D 133/00* (2013.01); *C01P 2004/04* (2013.01); *C01P 2004/34* (2013.01); *C01P 2004/60* (2013.01); *C01P 2004/61* (2013.01); *C01P 2004/62* (2013.01); *C01P 2004/64* (2013.01); *C08J 2325/08* (2013.01); *C08J 2333/10* (2013.01)

(58) Field of Classification Search
CPC ....... C09C 1/3063; C09C 1/3669; C09C 3/08; C09D 7/125; C09D 7/1216; C09D 7/1291; C08J 3/05
See application file for complete search history.

(56) References Cited

U.S. PATENT DOCUMENTS

| | | |
|---|---|---|
| 4,427,836 A | 1/1984 | Kowalski et al. |
| 6,576,051 B2 | 6/2003 | Bardman et al. |
| 7,179,531 B2 | 2/2007 | Brown et al. |
| 7,288,146 B1 | 10/2007 | Nicolai et al. |
| 2007/0215005 A1 | 9/2007 | Nicolai et al. |
| 2010/0048750 A1 | 2/2010 | Blom et al. |
| 2013/0029880 A1 | 1/2013 | Cregg et al. |
| 2013/0096250 A1 | 4/2013 | Bohling et al. |

FOREIGN PATENT DOCUMENTS

| | | |
|---|---|---|
| EP | 1787959 A1 | 5/2007 |
| EP | 2426166 A1 | 3/2012 |

OTHER PUBLICATIONS

Odian, G. Principles of Polymerization, 4th ed., John Wiley & Sons, Inc., 2004 (Book reference not included).
Rowan et al., Angew. Chem. Int. Ed. 2002, 41, 989-952.
The Pigment Handbook, vol. 1, 2nd Ed., John Wiley & Sons, NY (1988) (Book reference not included).
Pigment Handbook, T. C. Patton, Ed., Wiley-Interscience, New York, 1973 (Book reference not included).
Boronic Acids, ed. By Dennis G. Hall, 2005 (Book reference not included).
C. R. Martens In "Emulsion and Water-Soluble Paints and Coatings" (Reinhold Publishing Corporation, New York, NY, 1965 (Book reference not included).
Maskara et al. Agglomeration during the drying of fine silica powders, vol. 80, No. 7, 1997.

*Primary Examiner* — Edward J Cain

(57) ABSTRACT

This invention provides methods and technology related to increased hiding power of a coating through mediating the interaction of the pigment with other system components including but not limited to other pigment particles, latex paint particles, latex binding particles, and organic or inorganic hollow particles. Organization and spacing are tailored via pH sensitive functionalities hosted on ligands or polymeric spacers that are located at/within the surface of one of the components.

32 Claims, 1 Drawing Sheet

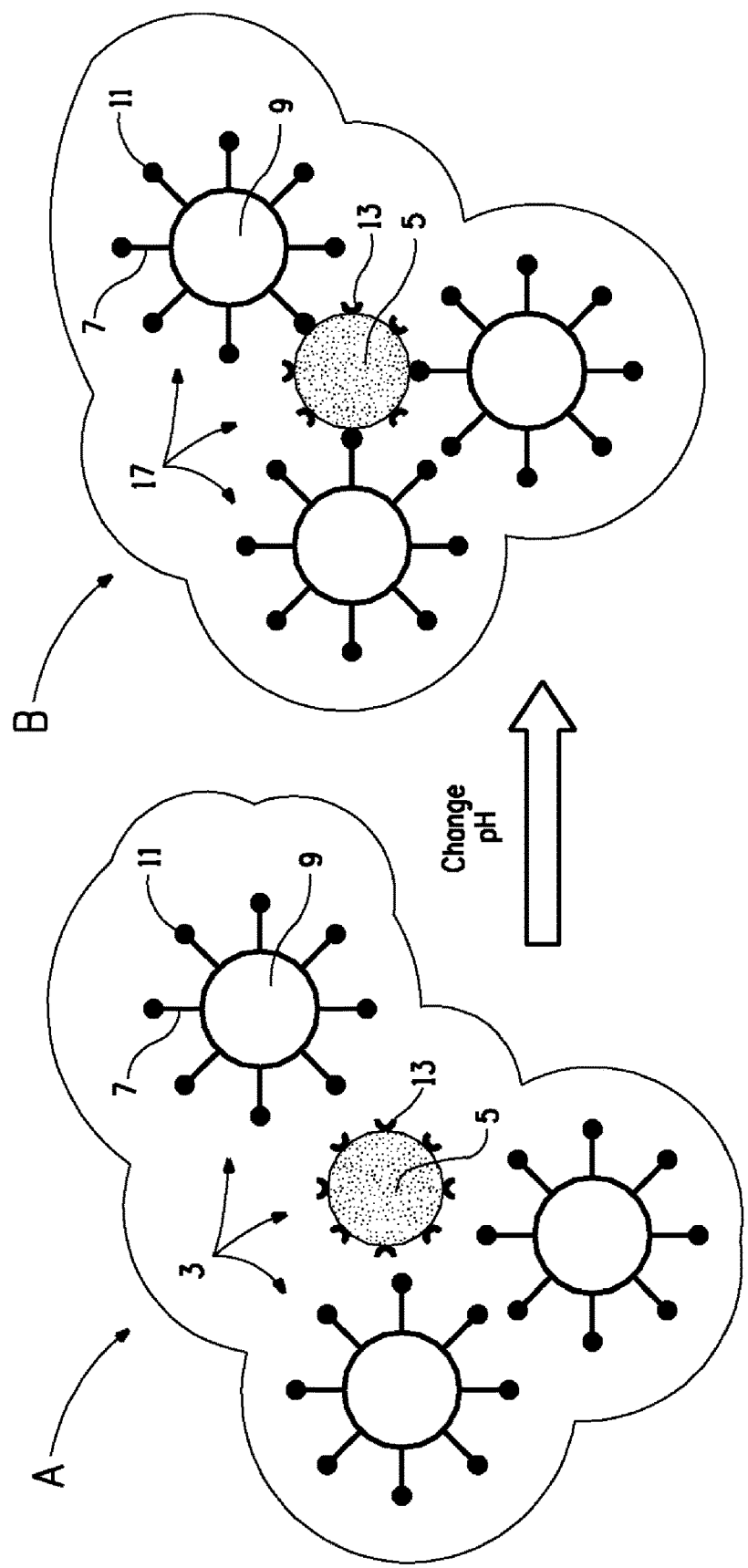

TAILORED DISPERSION AND FORMATION OF INTEGRATED PARTICLE SYSTEMS VIA PH RESPONSIVE GROUPS

FIELD OF THE INVENTION

The invention relates to a process for tailoring particle dispersion and interaction in paint formulations, preferably aqueous environments, more specifically to binding particles functionalized with pH responsive groups that enable controlled chemical binding to components such as inorganic particles and their applications.

BACKGROUND

Hiding power may be defined as a coating's ability to visibly obscure a surface onto which it is applied. Most coating manufacturers try to create coatings, such as paints, having high hiding power. Unfortunately, many challenges can occur during coating manufacturing resulting in final coatings having low hiding power. Combining coating components with insufficient attention to composition and interaction between components may result in uncontrolled flocculation, grit, or in the extreme case, gelation during its manufacturing, while it is sitting on a shelf, or upon its drying. Agglomeration of coating components, a cause of grit formation and gelation, as well as heterogeneous spacing of components in the final film are therefore undesirable as these factors lead to reduced hiding power of the coating. A need exists to control component spacing to help organize components, such as inorganic particles, to avoid agglomeration and maximize a coating's hiding power by creating an organized structure of composition components.

Some technologies counteract these problems by adding specific components to the paint that solely function to increase hiding power. One mechanism involves the delivery of air voids within a coating composition. These air voids may be delivered as individual particles (U.S. Pat. No. 4,427,836) or as part of a structure that encapsulate $TiO_2$ particles (US20100048750). The size of the voids contributes to the organization of coating particles and enhances total hiding power based on the cumulative effect of Mie scattering and reduction of the apparent refractive index of the coating. Enhanced hiding results from the delivery of air to the coating and is not due to specific binding interactions between pigment and other paint components.

Additional methods to maximize hiding power and keep components separated in a composition include the addition of bulky organic/inorganic coatings on the surface of inorganic particles. Other methods modify the surface of inorganic particles with functional spacers to create steric hindrance or electrostatic repulsion between components of a composition. Some methods enhance the hiding power of a coating by adding additional components such as micron-sized inorganic host particles that physically bind pigment particles in well-spaced pores (US2013029880).

The hiding power of a coating can also be increased by the addition of functionalized latex solid particles to a coating. The solid latex particles bind covalently (U.S. Pat. No. 7,179,531) or non-covalently (US2013/0096250) to inorganic particles in a coating to aid in particle spacing and organization. Problems with this technology include the formation of strong, uncontrolled associations or attachments between the functionalized latex solid particles and inorganic particles that leads to grit formation, less than optimal hiding power, and reduced gloss and scrub resistance of resultant coatings. Variations in functional particle composition, the ratio of functional particles to inorganic particles, order of addition, and mixing intensity have been attempted to reduce adverse effects of uncontrolled strong binding (U.S. Pat. No. 6,576,051 and EP2426166).

Weaker non-covalent associative bonds formed between components of a composition may enhance hiding power of a coating by spacing the components under conditions that reduce grit formation. However, problems exist with forming bonds between components when there are pH changes within a coating as it dries, adsorbing dispersants, thickeners, binders, and increased mixing intensity in an aqueous dispersion as a coating is being manufactured. What is desired is a method of enhancing the hiding power of a coating that allows components of a coating to form stronger bonds, such as covalent bonds, without increasing the likelihood of grit formation or the need for extensive process control during formulation and the final drying of a coating, such as paint.

SUMMARY OF INVENTION

Herein, we disclose compositions and methods of manufacturing Integrated Inorganic Systems (IIS) that are formed within a specific pH range. An IIS allows for robust chemical bonds to be formed between inorganic particles and binding particles within a composition resulting in the composition having preferred spacing of components, enhanced hiding power, and reduced grit.

One method of the present invention includes a process for making a pre-integrated inorganic system component dispersion comprising: a) providing i) one or more binding particles selected from the group consisting of solid inorganic particles, hollow inorganic particles, or combinations thereof, wherein one or more binding particles has on its surface one or more spacers comprising one or more pH responsive groups, wherein the one or more pH responsive groups are selected from the group comprising sulfonic acids, phosphonic acids, carboxylic acids, amines, boronic acids, salts and esters thereof, or combinations thereof, ii) one or more second inorganic particles comprising one or more target sites, and a solvent; and b) creating a dispersion comprising the one or more binding particles, the one or more second inorganic particles, and the solvent at a first pH to prevent formation of chemical bonds between the one or more pH responsive groups and the one or more target sites. It is preferred that the solvent is water and the first pH may be greater than 10 or less than 10 dependent upon the pH responsive groups present on specific binding particles. The solid inorganic particles or hollow inorganic particles may be made of multi-compartment silica, alumina, aluminum phosphate, zirconia, titania or combination thereof. It is preferred that the second inorganic particles are $TiO_2$ particles and the second inorganic particles may be solid particles, hollow particles, or combinations thereof. A spacer may comprise vinyls, diols, amino alcohols, isocyanates, epoxides, thiols, alkynes, azides, silanes, siloxanes, amines, carboxylic acids, phosphonic acids, boronic acids, sulfonic acids carboxylic acids, and salts or esters thereof. The binding particles may be in the size range from 10-1000 nm in diameter, and the number of binding particles to one or more second inorganic particles is between 1-1000. Depending upon the product to be formed, the second inorganic particles may have a size that is greater than 200 nm as pigment particles or are less than 200 nm as nanoparticles. This process of the present invention may further comprising the step of forming an integrated inorganic system by changing the pH of the dispersion to a level sufficient to enable the formation of chemical bonds between the one or more binding groups and the one or more second inorganic particles.

Another embodiment of the present invention is a process for making a Integrated Inorganic system comprising: a) providing i) one or more binding particles selected from the group consisting of solid inorganic particles, hollow inorganic particles, hollow polymer particles, or combinations thereof, wherein the one or more binding particle has on its surface one or more spacers including one or more pH responsive group, wherein the one or more pH responsive groups are selected from the group comprising sulfonic acids, phosphonic acids, carboxylic acids, amines, boronic acids, salts and esters thereof, or combinations thereof, ii) one or more second inorganic particles comprising one or more target sites, and solvent; b) creating a dispersion comprising the one or more binding particles, the one or more second inorganic particles, and the solvent at a first pH to prevent the formation of chemical bonds between the one or more pH responsive groups and the one or more target sites; and c) forming an integrated inorganic system by changing the pH of the dispersion to a second pH to enable the formation of chemical bonds between the one or more pH responsive groups and the one or more target sites. The solvent is preferably water and the hollow polymer particles preferrably maybe a multi-compartment acrylic polymer, styrenic, styrene-acrylic polymer, a vinyl ester polymer, or ethylene-vinyl ester polymer. The solid inorganic particles and hollow inorganic particles may be silica, alumina, aluminum phosphate, zirconia, titania or combination thereof. It is preferred that the second inorganic particle is $TiO_2$ and the second inorganic particles may be solid, hollow, or combinations thereof. The spacer may comprise vinyls, diols, amino alcohols, isocyanates, epoxides, thiols, alkynes, azides, silanes, siloxanes, amines, carboxylic acids, phosphonic acids, boronic acids, sulfonic acids and salts or esters thereof. The binding particles may be in the size range from 10-1000 nm and the number of binding particles to second inorganic particles is between 1-1000. Depending upon the product to be formed, the second inorganic particles may have a size that is greater than 200 nm or less than 200 nm.

Another embodiment of the present invention is a process of forming an pre-Integrated Inorganic System component dispersion comprising: a) providing i) one or more binding particles selected from the group consisting of hollow polymer particles, and wherein the binding particle has one or more spacers on its surface, wherein the one or more spacers comprise one or more pH response groups and the one or more pH responsive groups and the one or more pH responsive groups are selected from the group comprising sulfonic acids, phosphonic acids, carboxylic acids, amines, boronic acids, the corresponding salts and esters thereof, or combinations thereof, ii) one or more second inorganic particles comprising one or more target sites and iii) a solvent; b) creating a dispersion comprising the one or more binding particles, the one or more second inorganic particles, and the solvent at a pH sufficient to prevent formation of chemical bonds between the functional groups and the second inorganic particles; and forming a complex by changing the pH of the dispersion to a level sufficient to enable the formation of chemical bonds between the one or more binding particles and the one or more second inorganic particles. The solvent is preferably water.

Another embodiment of the present invention includes a process of forming an pre-Integrated Inorganic System component dispersion comprising: a providing a) one or more binding particles selected from the group consisting, and solid polymer particles wherein the one or more binding particle has one or more spacers, wherein the one or more spacers comprise one or more pH response groups and the one or more pH responsive groups are selected from the group comprising sulfonic acid, amines, boronic acids, the corresponding salts and esters thereof, or combinations thereof, b) one or more second inorganic particles comprising one or more target sites, and a solvent; b) creating a dispersion comprising the one or more binding particles, the one or more second inorganic particles, and the solvent at a pH sufficient to prevent formation of chemical bonds between the one or more binding particles and the one or more second inorganic particles; and c) forming an integrated inorganic system by changing the pH of the dispersion to a level sufficient to enable the formation of chemical bonds between the one or more binding groups and the one or more second inorganic particles. The solvent is preferably water.

Another embodiment of the present invention includes a process for making a pre-integrated inorganic system component dispersion comprising: a) providing i) one or more binding particles selected from the group consisting of solid inorganic particles, hollow inorganic particles or combinations thereof, wherein the one or more binding particle has on its surface one or more spacers comprising one or more pH responsive groups, wherein the pH responsive groups are selected from the group comprising sulfonic acid, phosphonic esters acids, carboxylic acids, amines, epoxides, boronic acids, the corresponding salts and esters thereof, or combinations thereof, ii) one or more second inorganic particles comprising one or more target sites, and a solvent; b) creating a dispersion comprising the binding particles, the second inorganic particles, and the water at a first pH to prevent formation of chemical bonds between the pH responsive groups and the target sites, and c) drying the dispersion to form a dry powder including the complex. The solvent is preferably water.

Another embodiment of the present invention includes a process for making a pre-integrated inorganic system component dispersion comprising: a) providing i) one or more binding particles selected from the group consisting of solid inorganic particles, hollow inorganic particles, or combinations thereof, wherein the one or more binding particle has on its surface one or more spacers comprising one or more pH responsive groups, wherein the pH responsive groups are selected from the group comprising sulfonic acids, phosphonic esters, carboxylic acids, amines, epoxides, boronic acids, the corresponding salts and esters thereof, or combinations thereof, ii) one or more second inorganic particles comprising one or more target sites, and a solvent (preferably water); b) creating a dispersion comprising the one or more binding particles, the one or more second inorganic particles, and the solvent at a first pH to prevent formation of chemical bonds between the pH responsive groups and the target sites; and c) drying the dispersion to form a dry powder. The dry powder may then be added into a coating formulation such as a paint.

BRIEF DESCRIPTION OF THE FIGURES

FIG. 1 illustrates a method of creating an IIS.

DETAILED DESCRIPTION

It is to be understood that this invention is not limited to particular embodiments, which can, of course, vary. It is also to be understood that the terminology used herein is for the purpose of describing particular embodiments only, and is not intended to be limiting. Further, all publications referred to herein are incorporated by reference herein for the purpose cited to the same extent as if each was specifically and individually indicated to be incorporated by reference herein.

As used in this specification and the appended claims, terms in the singular and the singular forms "a," "an," and "the," for example, include plural referents unless the content clearly dictates otherwise. Thus, for example, reference to "hollow polymer particle," "the hollow polymer particle," or "a hollow polymer particle" also includes a plurality of hollow polymer particles. Use of the term "a hollow polymer particle" also includes, as a practical matter, many occurrences of that hollow polymer particle.

Additionally, as used herein, "comprising" is to be interpreted as specifying the presence of the stated features, integers, steps, or components as referred to, but does not preclude the presence or addition of one or more features, integers, steps, or components, or groups thereof. Thus, for example, a sample comprising a hollow polymer particle may contain additional hollow particle components or other components, such as other solid polymer particles. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range. All references cited in this document are incorporated herein by reference. Specifically methods of making binding particles such as solid and hollow particles and the products of those methods as described in commonly owned U.S. patent applications numbers: U.S. Provisional Application No.: 61/950,860; filed Mar. 11, 2014, U.S. Provisional Application No.: 61/950,861; filed Mar. 11, 2014, U.S. Provisional Application No.: 61/950,862; filed Mar. 11, 2014, U.S. Provisional Application No.: 61/950,863; filed Mar. 11, 2014, U.S. Provisional Application No.: 61/950,864; filed Mar. 11, 2014, U.S. Provisional Application No.: 61/950, 866; filed Mar. 11, 2014, U.S. Provisional Application No.: 61/950,867; filed Mar. 11, 2014, U.S. Provisional Application No.: 61/950,872; filed Mar. 11, 2014, U.S. Provisional Application No.: 61/950,873; filed Mar. 11, 2014, U.S. Provisional Application No.: 61/950,875; filed Mar. 11, 2014, U.S. Provisional Application No.: 61/950,876; filed Mar. 11, 2014, U.S. Provisional Application No.: 61/950, 882; filed Mar. 11, 2014, U.S. Provisional Application No.: 61/950,883; filed Mar. 11, 2014, U.S. Provisional Application No.: 61/950,895; filed Mar. 11, 2014, U.S. Provisional Application No.: 61/950,898; filed Mar. 11, 2014, U.S. Provisional Application No.: 61/950,903; filed Mar. 11, 2014, U.S. Provisional Application No.: 61/950,908; filed Mar. 11, 2014, are incorporated herein by reference.

A description of the present invention is shown in FIG. 1 illustrating one method contemplated herein. Pre-Integrated Inorganic System components ("Pre-IIS components") 3 comprise inorganic particles 5 and binding particles 9. The pre-IIS components are designed to be present in wet compositions A such as wet paints. Attached to the surface of the binding particles 9 are one or more spacers 7 that include one or more pH responsive groups 11. On the surface of the inorganic particles 5 are target sites 13. In another embodiment, the integrated system forms in-situ when a composition dries B, its pH may change and become higher or lower and the one or more pH responsive groups 11 form a chemical bond with the one or more target sites 13 located on one or more inorganic particles 5 resulting in one or more binding particles 9 binding to one or more inorganic particles 5 forming an Integrated Inorganic System ("IIS") 17. The formation of an IIS 17 results in enhanced hiding power and defined spacing between pre IIS components 3 that further defines a minimum distance between two or more inorganic particles 5. The present invention creates an Integrated Inorganic System (IIS) with the creation of chemical bonds between binding particles and inorganic particles, specifically between pH responsive groups and target sites.

Binding Particles

Binding particles used in the present invention include, but are not limited to, solid inorganic particles, solid and/or hollow polymer binding particles, organic and/or inorganic hollow binding particles, or a combination thereof.

Solid Polymer Particles Used as Binding Particles

Solid polymer binding particles of many different sizes and compositions may be used as binding particles. Solid polymer binding particles may be made by many different methods but are most commonly produced via emulsion polymerization (Odian, G. Principles of Polymerization, 4th ed., John Wiley & Sons, Inc., 2004).

In one aspect of the present invention, the solid polymer binding particles are synthesized via conventional radical emulsion polymerization to produce particles bearing pH sensitive functional groups throughout the bulk of the particle, preferably with pH sensitive functional groups exposed at the surface of the particle. The resultant binding particles are typically spherical in shape and have a mean diameter of 10 nm to 1 µm, more preferably 10 nm to 300 nm, more preferably 50 nm to 200 nm, most preferably 75-150 nm. The pH sensitive functional groups included in the composition of the solid polymer binding particles are imparted to the solid polymer particles by monomers employed in the radical emulsion polymerization. Those pH sensitive functional groups may include but are not limited to phosphonic acids, sulfonic acids, boronic acids, carboxylic acids, primary amines, secondary amines, tertiary amines, their corresponding salts, and the corresponding esters of the acids.

The solid polymer binding particles are typically prepared using an organic monomer which is polymerized to generate solid polymer particles, commonly also known as latex particles. Some applicable primary monomers include but are not limited to styrene, methyl methacrylate, methyl acrylate, n-butyl methacrylate, n-butyl acrylate, more typically styrene, methyl methacrylate, and n-butyl methacrylate. The primary monomer may be present as measured by weight fraction of the final solid polymer particle at 0-100%, more preferably 50-100%, more preferably 75-99%, most preferably 90-99%. Similarly, a group of two or more secondary monomers can be chosen to perform a copolymerization. As an aspect of the invention the secondary monomer is typically chosen to impart the pH sensitive functionality to the solid polymer particle. Applicable secondary monomers employed for this purpose include but are not limited to methacrylic acid, itaconic acid, 2-(methacryloxy)ethyltrimethylammonium chloride 2-aminoethylmethacrylate, diethylaminoethyl methacrylate, diisopropylaminoethyl methacrylate, dimethylaminoethyl methacrylate, 1-vinyl-2-pyrolidinone, 4-vinylpyridine, vinylbenzyltrimethylammonium chloride, phosphoric acid 2-hydroxyethyl methacrylate, vinylphosphonic acid, 4-vinylbenzenephosphonic acid, 3-sulfopropyl methacrylate, vinylsulfonic acid, 4-vinylbenzylsulfonic acid, vinylboronic acid, 4-vinylbenzeneboronic acid, 1-phenylvinylboronic acid, but-3-enylboronic acid, pent-3-enylboronic acid, hex-3-enylboronic acid, their corresponding salts, and the corresponding esters of the acids. The secondary monomers are present in the amount of about 0.1-100%, more preferably 1-50%, more preferably 1-20%, most preferably 1-10% based on the total weight of the components used in the preparation of the solid polymer particle.

Typically the particle size of the solid polymer particle is tunable with a correspondingly narrow particle size distribution, which is advantageous. For example, preparation of the solid polymer binding particle by emulsion polymerization is achieved by emulsification of the water-insoluble monomer or a monomer mixture in water followed by polymerization using radical or photopolymerization conditions. Radical initiators such as potassium-persulfate, ammonium persulfate, and 2,2-azobis(2-methylpropionamidine) hydrochloride (AIBA) can be used, more typically potassium persulfate. Surfactant can also typically be used to aid formation of the emulsion droplets. Some examples of suitable surfactants include but are not limited to sodium dodecylsulfate (SDS), dioctylsulfosuccinate sodium salt (DSS), sodium dodecylbenzene sulfonate (SDBS), cetyltrimethylammonium bromide (CTAB), and poly-(vinylpyrrolidinone) PVP, more preferably dioctylsulfosuccinate sodium salt (DSS) or sodium dodecylbenzene sulfonate (SDBS). In some cases, it might be preferable to use comonomers that can crosslink two growing polymer chains, thereby strengthening the template particle. Some of those comonomers capable of crosslinking in radical polymerizations include divinylbenzene and ethylene glycol dimethacrylate. In order to perform the polymerization, the reaction temperature is kept between about 0 and about 100° C., more typically about 15 to about 90° C., still more typically about 25° C. to about 80° C.

By aqueous monomer dispersion we mean water or a mixture of water and surfactant, initiator, defoaming agent, or a suitable buffer in cases where pH needs to be kept in a particular range.

Hollow Inorganic Particles Used as Binding Particles

Hollow inorganic particles of many sizes may be used as binding particles. They are made by several different methods. One method comprises: a) providing a recyclable template particle in an aqueous dispersion, wherein the recyclable template particle is prepared from an organic monomer, b) coating the recyclable template particle with a solvent-based silica precursor such as tetraethyl orthosilicate (TEOS), tetramethyl orthosilicate (TMOS) tetrapropyl orthosilicate (TPOS), tetrabutyl orthosilicate (TBOS), tetrahexyl orthosilicate, diethoxydimethylsilane, ethoxytrimethylsilane, methoxytrimethylsilane, trimethoxy(octyl)silane, triethoxy(octyl)silane, methoxy(dimethyl)octylsilane, or 3-aminopropyl-(diethoxy)methylsilane; more typically tetraethyl orthosilicate (TEOS) or terrapropyl orthosilicate (TPOS), or any siloxanes with general formula $RSi(OR)_3$, $R_1R_2Si(OR)_2$, or $R_1R_2R_3SiOR$, wherein R, $R_1$, $R_2$, and $R_3$ can be alkyl of about 1 to about 20 carbon atoms, more typically about 2 to about 10 carbon atoms, aryl groups of about 6 to about 10 carbon atoms, more typically about 6 to about 8 carbon atoms or combinations thereof; or water-based silica precursor such as such as sodium silicate, potassium silicate, ammonium silicate or pre-formed silicic acid, more typically sodium silicate or potassium silicate; c) maintaining the pH at about 7 to about 10 to form core/shell particles comprising a silica treatment, typically a layer on the recyclable template particle; d) isolating the core-shell particles from solution; and e) removing the recyclable template particle from the core/shell particles to form a hollow silica particle. Typically the recyclable template particle is removed by thermal depolymerization, typically by heating at temperatures of about 60° C. to about 500° C., or by acid or base hydrolysis.

The recyclable template particle or core is prepared using typically an organic monomer which is polymerized to generate template particles. Some monomers for the template include styrene, methyl methacrylate, α-methylstyrene, lactic acid, or formaldehyde, more typically methyl methacrylate, lactic acid, or α-methylstyrene, and still more typically methyl methacrylate or α-methylstyrene. Similarly, a group of two monomers can be chosen for a copolymerization, such as a variety of diacids and dialcohols for polyester polymers (like polyethylene terephthalate, PET), diacids and diamides for various polyamides (like Nylon 6,6, or other Nylons), etc. The monomers are present in the amount of about 1 to about 60 wt %, more typically about 2 to about 50 wt %, still more typically about 5 to about 40 wt %, based on the total weight of the components used in the preparation of the recyclable template particle. Typically, the particle size of the template is tunable, and the particle size distribution of the template particles achieved is narrow, which is advantageous. For example, preparation of the recyclable template particle or core by emulsion polymerization is achieved by emulsification of the water-insoluble monomer or a monomer mixture in water, and polymerized using radical or photopolymerization conditions. Radical initiators such as potassium- or ammonium persulfate, and 2,2-azobis(2-methylpropionamidine) hydrochloride (AIBA) can be used, more typically AIBA. Surfactant can also typically be used. Some examples of suitable surfactants include sodium dodecylsulfate (SDS), cetyltrimethylammonium bromide (CTAB), poly-(vinylpyrrolidinone) PVP, etc. In some cases, it might be advantageous to use copolymers in order to introduce charge on the surface of the particle, like for example vinyltimethylammonium chloride benzene, 2-(methacryloxy)ethyltrimethylammonium chloride, etc. In cases where silica is deposited onto the template surface, it might be beneficial to use a copolymer with a silyl group, to promote the silica deposition on the particle surface like for instance 3-(trimethoxysilyl)propylmethacrylate, or other silyl-containing monomers. In some cases, it might be preferable to use comonomers that can crosslink two growing polymer chains, thereby strengthening the template particle-some of those materials include divinylbenzene or ethylene glycol dimethacrylate. In order to perform the polymerization, the reaction temperature is kept between about 0 and about 100° C., more typically about 15 to about 90° C., still more typically about 25° C. to about 70° C.

By aqueous monomer dispersion we mean water or a mixture of water and surfactant, initiator, defoaming agent, or a suitable buffer in cases where pH needs to be kept in a particular range.

The recyclable template particle or core is then coated with a shell material to generate a core/shell particle. To generate a silica treatment or shell, at least one solvent-based silica precursor or water-based silica precursor described earlier can be used.

When using organic siloxanes, the reaction is typically done in a dilute ethanol/water ammonia solution, with or without sonication. Typically, the suspension of recyclable template particles in dilute ethanol/water solution of ammonia is treated with the solvent based silica precursor, which results in silica deposition on the recyclable template particles, generating core shell particles.

The pH is maintained at about 7 to about 10, more typically about 8 to about 10 to form a silica layer on the recyclable template particle and the reaction times are held between about 1 to about 24 hours, more typically about 1.5 to about 18 hours, still more typically about 2 to about 12 hours. This results in the deposition of a silica treatment or shell on the recyclable template particle or core.

The solids are removed from the aqueous solution by centrifugation or filtration, more typically by centrifugation.

Depending on the nature of the recyclable template particle, the recyclable template particle that constitutes the core can be recycled either through thermal depolymerization, or acid- or base hydrolysis. Typically, core materials made out of poly-($\alpha$-methylstyrene), PMMA, various polyamides, as well as styrene are depolymerized at increased temperatures, with the temperatures of depolymerization varying with the polymer used. Some suitable temperature ranges include about 250 to about 450° C., more typically about 275 to about 400° C., still more typically from 290-325° C., to generate hollow particles as well as core monomer. For example, poly(methylmethacrylate)@silica core/shell particles can be heated above around about 300° C. to generate methyl methacrylate monomer and hollow silica particles. Further, poly($\alpha$-methylstyrene)@silica can be heated to about above 60° C. to generate hollow silica particles and $\alpha$-methylstyrene monomer.

Alternatively, acid- or base-labile core materials can be hydrolyzed instead of thermally depolymerized to generate hollow particles with possibility of monomer recycling. Polymers such as Delrin® (polyacetal), poly(lactic acid), as well as other polyesters can be depolymerized through acid hydrolysis. For example, treating polyacetal@silica with acid should generate hollow silica as well as aldehyde monomer that can be recycled in template particle synthesis. Similarly, polyesters or polyamides from core/shell particles can be recycled in the same fashion to generate diacid/dialcohol (diacid/diamine) monomer couples as well as hydroxylic or amino acids as monomers (like in the case of polylactic acid, for example).

These depolymerization methods allow for hollow particle formation, as well as, being non-destructive toward core monomers, allowing for template material recycling.

In another specific embodiment, functionalized hollow silica particles are prepared by a process comprising: a) providing a core-shell silica particle comprising a template core particle and a silica treatment, more typically a coating, wherein the core-shell silica particle has an outer surface; and wherein the silica treatment is prepared using a solvent-based silica precursor; b) creating a functionalized surface on the core-shell silica particle, wherein the functionalized surface is prepared using sulfonic acid, phosphonic esters, carboxylic acid, amines, epoxides, boronic acids or quarternary amines, and c) removing the template core particle to form a functionalized hollow silica particle.

The template core particle may be removed before or after functionalization, more typically before functionalization. If removed after functionalization, it is important the core removal does not damage the functionalized surface. For example, with $\alpha$-methyl styrene core removal is at low temperatures so no undesired modification is done to the functionalized surface if core removal is achieved after functionalization. Also acid- or base-labile core materials that can be removed by hydrolysis can be removed before or after functionalization.

The core-shell silica particle comprising a template core particle and a silica treatment, typically a coating, is prepared by a process comprising: a) providing a template core particle, more typically prepared using emulsion polymerization; b) coating the template particle with a solvent-based silica precursor or water-based silica precursor described earlier; and c) maintaining the pH at about 2 to about 10 to form a core/shell particle comprising a silica treatment on the template particle.

The template particle or core is prepared using typically an organic monomer which is polymerized to generate template particles, or dispersed in water to generate template particles of the appropriate size. Monomers described earlier are also useful in this process.

Alternately, the template particle or core may be inorganic, for example calcium carbonate, or other inorganic particles onto which silica can be deposited.

The template particle or core is then coated with a shell material to generate a core/shell particle. To generate a silica treatment or shell, at least one solvent-based silica precursor or water-based silica precursor described earlier can be used. Typically, the suspension of template particles in dilute ethanol/water solution of ammonia is treated with the solvent based silica precursor, which results in silica deposition on the recyclable template particles, generating core shell particles. In the case of a water-based silica precursor, such as sodium- or potassium silicate, the template particles are suspended in water, and the silicate agent is added either dropwise, over a period of time, or all at once.

The pH is maintained at about 2 to about 10, more typically about 5 to about 8 to form a silica layer on the recyclable template particle and the reaction times are held between about 1 to about 24 hours, more typically about 1.5 to about 18 hours, still more typically about 2 to about 12 hours. This results in the deposition of a silica treatment or shell on the recyclable template particle or core.

The solids are removed from the aqueous solution by centrifugation or filtration, more typically by centrifugation.

Typically, in order to form impervious silica shells, surface area and porosity of the silica walls have to be tuned. Whether the silica shell is adequate can be determined by comparing the surface area of the particles with calculated surface area of a smooth sphere of the same diameter. Typically, we consider the shell impervious if its surface doesn't surpass about 130% of the calculated surface area of a smooth sphere of the same dimensions, i.e., it is about less than 30% above the surface area of the core-shell silica particle prior to functionalization, more typically about 125% of the smooth sphere surface area, and still more typically about 120% of the smooth sphere surface area of the same dimensions. Addition of various amounts of the silica precursor will lead to more or less porous silica layers, which can lead to control of the porosity and surface area of the particles. Further, the silica precursor may be added in stages to modulate the porosity of the particles as well as their surface. Lastly, calcination at temperatures higher than 500° C. can decrease the porosity and surface area of the particles without increasing the thickness of the wall.

The core may then be removed before or after grafting of a variety of alkoxysilanes onto the surface of the silica particles to form hollow silica particles having a functionalized surface using techniques described earlier.

The functionalized surface on the silica particle may be prepared using sulfonic acid, phosphonic esters, carboxylic acids, amines, epoxides, boronic acids, quaternary amines, etc. Grafting of a variety of alkoxysilanes onto the surface of the hollow silica particles provides functionalized hollow silica particles. A large spectrum of functionalities can be introduced onto the silica surface, for example silyl phosphonates, phosphonic acids, amines, alcohols, epoxides, carboxylic acids, thiols, thioethers, carbamates, isocyanates, quarternary ammonium ions, etc. The grafting process includes mixing the grafting agent with silica particles, with or without the solvent, with optional heating of the material, in the temperature range 25-150° C., more typically 60-130° C., still more typically 80-120° C., with or without the application of vacuum, in order to remove the volatile byproducts, like water or alcohols. In one embodiment of the disclosure, the hollow silica particles were functionalized with (diethoxyphosphoryl)methyl-2-((triethoxysilyl)ethyl) carbamate, introducing phosphonate functionality on the surface. In another embodiment of the invention, the silica particles were functionalized with diethyl [2-(triethoxysilyl) ethyl]phosphonate to generate phosphonate-functionalized silica particles. Then, in another embodiment, phosphonate ester functionality on the surface of the silica particles was hydrolyzed to generate phosphonic acid-functionalized hollow silica particles. In another embodiment of the disclosure, silica particles were treated with (3-glycidopropyl) trimethoxysilane, to generate epoxy functionality on the silica surface. The epoxy silica was then treated, in one embodiment of the disclosure, with glycine, to introduce carboxylic acid functionality through an amine linkage on the particle. In another, the epoxy silica was treated with thioglycolic acid to introduce the carboxylic functionality through a thioether group.

In still another specific embodiment, the silica/polymer hollow nanospheres are prepared by a process comprising: a) providing a mixture comprising water, at least one non-reactive solvent; at least one acrylic or styrenic monomer; at least one solvent based silica precursor or a polymerizable silane or combinations thereof or a water based silica precursor; an initiator; and at least one surfactant; b) shearing the components of the mixture from (a) with high shear energy at an energy density of at least 10^6 J/m^3 to form a mini-emulsion; and c) heating to at least about 50° C., more typically about 50° C. to about 90° C.; and still more typically about 60° C. to about 80° C. to form, in one step, a silica/polymeric hybrid network comprising a silica/polymeric hybrid hollow nanosphere.

By non-reactive solvent we mean that the solvent does not substantially react, more typically does not react, with any of the other components added to the reaction.

These nanospheres have a particle size of about 5 nm to about 400 nm, more typically about 50 nm to about 300 nm, and still more typically about 100 nm to about 250 nm.

The non-reactive solvent may be an alkane, a hydrocarbon oil, aromatic hydrocarbon or halogenated hydrocarbon liquid, more typically alkane or hydrocarbon oil. The at least one acrylic or styrenic monomer may be methyl methacrylate, methyl acrylate, n-butyl methacrylate, t-butyl methacrylate, t-butyl acrylate, ethyl glycol dimethacrylate, styrene or divinylbenzene; more typically methyl methacrylate or styrene. Some suitable solvent-based silica precursors or water-based silica precursors are described earlier. Some suitable initiators include azo compounds such as 2,2'-azobisisobutyronitrile (AIBN) or 2,2'-azobis(2-methylpropionamide) dihydrochloride (AIBA); metal persulfate such as potassium persulfate (KPS) or sodium persulfate; more typically AIBN or KPS.

Polymerizable silanes such as allyltriethoxysilane, allyltrimethoxysilane, diethoxy(methyl)vinylsilane, dimethoxymethylvinylsilane, triethoxyvinylsilane, trimethoxy(7-octen-1-yl)silane, 3-(trimethoxysilyl)propyl acrylate, 3-(trimethoxysilyl)propyl methacrylate, or vinyltrimethoxysilane are useful in this disclosure, more typically 3-(trimethoxysilyl)propyl acrylate or 3-(trimethoxysilyl) propyl methacrylate. At least one surfactant is part of the mixture in step (a).

Some suitable surfactants include cetyltrimethylammonium bromide (CTAB), lauryltrimethylammonium bromide, dodecyltrimethylammonium bromide, octyltrimethylammonium bromide, sodium dodecyl sulfate (SDS), sodium dodecylbenzene sulfonate (SDBS), dioctylsulfosuccinate, non-ionic surfactants such as alkylphenol polyoxyethylene, polyoxyethylene glycol alkyl ethers, polyoxypropylene glycol alkyl ethers, octylphenol ethoxylates or poloxamers, more typically SDS, SDBS or CTAB. Some useful commercially available surfactants series include Triton X® manufactured by The Dow Chemical Company, Brij® manufactured by Croda International PLC, or Pluoronic® manufactured by BASF.

The mixture in step (a) may be prepared in any glass container or stainless steel reaction vessel.

The mixture of the above components is then sheared at an energy density of at least 10^6 J/m^3, more typically about 10^7 J/m^3 to about 5*10^8 J/m^3, to form a mini-emulsion. Some useful means for shearing include an ultrasonic disruptor, high speed blender, high pressure homogenizer, high shear disperser, membrane homogenizer or colloid mill, more typically an ultrasonic disruptor, high speed blender, or a high pressure homogenizer. Typically shearing occurs for a period of about 5 to about 120 minutes depending on amount of emulsion needed to be prepared and desired emulsion size range, more typically about 30 minutes to about 60 minutes. Typically, shearing is accomplished at room temperature. Optionally, a defoamer may be needed to avoid foaming during emulsifying. Some suitable defoamers include BASF Foamaster®, Dow Corning® 71 and 74 Antifoams.

The mini-emulsion formed in step (b) is then heated to at least about 50° C., more typically about 50° C. to about 90° C.; and still more typically about 60° C. to about 80° C. to form, in one step, a silica/polymeric hybrid network comprising a silica/polymeric hybrid hollow nanosphere. Heating may be accomplished using hot plate, heating mantle or any other heating method.

The non-reactive solvents and water may then be removed by heating or distillation before or after grafting of a variety of alkoxysilanes onto the surface of the silica particles to form hollow silica particles having a functionalized surface using techniques described earlier.

The functionalized surface on the silica particle may be prepared using sulfonic acid, phosphonic esters, carboxylic acids, amines, epoxides, boronic acids, quaternary amines, etc. Grafting of a variety of alkoxysilanes onto the surface of the hollow silica particles provides functionalized hollow silica particles. A large spectrum of functionalities can be introduced onto the silica surface, for example silyl phosphonates, phosphonic acids, amines, alcohols, epoxides, carboxylic acids, thiols, thioethers, carbamates, isocyanates, quarternary ammonium ions, etc. The grafting process includes mixing the grafting agent with silica particles, with or without the solvent, with optional heating of the material, in the temperature range 25-150° C., more typically 60-130° C., still more typically 80-120° C., with or without the application of vacuum, in order to remove the volatile byproducts, like water or alcohols. In one embodiment of the disclosure, the hollow silica particles were functionalized with (diethoxyphosphoryl)methyl-2-((triethoxysilyl)ethyl) carbamate, introducing phosphonate functionality on the surface. In another embodiment of the invention, the silica particles were functionalized with diethyl [2-(triethoxysilyl) ethyl]phosphonate to generate phosphonate-functionalized silica particles. Then, in another embodiment, phosphonate ester functionality on the surface of the silica particles was hydrolyzed to generate phosphonic acid-functionalized hollow silica particles. In another embodiment of the disclosure, silica particles were treated with (3-glycidopropyl) trimethoxysilane, to generate epoxy functionality on the silica surface. The epoxy silica was then treated, in one embodiment of the disclosure, with glycine, to introduce carboxylic acid functionality through an amine linkage on the particle. In another, the epoxy silica was treated with thioglycolic acid to introduce the carboxylic functionality through a thioether group.

In another specific embodiment, the inorganic hollow particle dispersions are prepared by a process comprising: a) forming an oil-in-water or water-in-oil minemulsion by high energy shearing at least one non-reactive solvent; at least one solvent- or water-based silica precursor, described earlier; and at least one surfactant; at an energy density of at least $10^6$ J/m$^3$; wherein the concentration of silica precursor is about 2 to about 10 wt %, more typically about 2 to about 7 wt %, still more typically about 2 to about 5 wt %; in the absence of a catalyst or alcohol cosolvent; and wherein the silica precursor to non-reactive solvent ratio is about 0.1 to about 6, more typically about 0.5 to about 3, still more typically about 1 to about 2; oil to water or water to oil ratio is about 0.01 to 0.35, more typically 0.05 to 0.2; and surfactant concentration is about 0.001 wt % to about 5 wt %, more typically 0.1 wt % to about 2 wt %; and b) initiating a one-step sol-gel reaction, or to allow the silica precursors to diffuse to the oil/water interface, where they hydrolyze and condense to form a silica shell resulting in silica hollow particles having a particle size of less than about 400 nm being formed.

In the first aspect, the one-step sol-gel reaction is initiated at room temperature, more typically about 20° C.-to about 90° C.

The disclosure relates to a process for preparing an inorganic hollow particle dispersion at a solids concentration of at least 2% solids, more typically about 2 wt % to about 7 wt %, still more typically about 2 wt % to about 5 wt %, These nanospheres have a particle size of less than about 400 nm, more typically about 5 nm to about 400 nm, still more typically about 50 nm to about 300 nm, and most typically about 100 nm to about 250 nm.

The non-reactive solvent; solvent and water-silica precursors; and surfactants are defined earlier. The concentration of silica precursor is about 2 to about 10 wt %, more typically about 2 to about 7 wt %, still more typically about 2 to about 5 wt %, The silica precursor to non-reactive solvent ratio is about 0.1 to about 6, more typically about 0.5 to about 3, still more typically about 1 to about 2; oil to water or water to oil ratio is about 0.01 to 0.35, more typically 0.05 to 0.2; and surfactant concentration is about 0.001 wt % to about 5 wt %, more typically 0.1 wt % to about 2 wt %, based on the total weight of all components. It is important because the combination of silica precursor to non-reactive solvent ratio, oil to water ratio and surfactant level determine the particle size, hollow or non-hollow particle structure, and allow high % solid hollow silica synthesis. The process is carried out in the absence of a catalyst or alcohol cosolvent.

The mixture in step (a) may be prepared in any glass container or stainless steel reaction vessel.

The mixture of the above components is then sheared at an energy density of at least $10^6$ J/m$^3$, more typically about $10^7$ J/m$^3$ to about $5*10^8$ J/m$^3$, to form a mini-emulsion. Some useful means for shearing include an ultrasonic disruptor, high speed blender, high pressure homogenizer, high shear disperser, membrane homogenizer or colloid mill, more typically an ultrasonic disruptor, high speed blender, or a high pressure homogenizer. Typically shearing occurs for a period of about 5 to about 120 minutes depending on amount of emulsion needed to be prepared and desired emulsion size range, more typically about 30 minutes to about 60 minutes. Typically, shearing is accomplished at room temperature. Optionally, a defoamer may be needed to avoid foaming during emulsifying. Some suitable defoamers include BASF's Foamaster®, Dow Corning® 71 and 74 Antifoams.

A one-step sol-gel reaction is then initiated using the mini-emulsion formed in step (b), by allowing the silica precursors to diffuse to the oil/water interface, where they hydrolyze and condense to form a silica shell resulting in silica hollow particles having a particle size of less than about 400 nm being formed. The one-step sol-gel reaction may be initiated at room temperature, more typically about 20° C. to about 90° C., and still more typically about 20° C. to about 70° C. Heating may be accomplished using hot plate, heating mantle or any other heating method.

The non-reactive solvents and water may then be removed by heating or distillation before or after grafting of a variety of alkoxysilanes onto the surface of the silica particles to form hollow silica particles having a functionalized surface using techniques described earlier.

The functionalized surface on the silica particle may be prepared using sulfonic acid, phosphonic esters, carboxylic acids, amines, epoxides, boronic acids, quaternary amines, etc. Grafting of a variety of alkoxysilanes onto the surface of the hollow silica particles provides functionalized hollow silica particles. A large spectrum of functionalities can be introduced onto the silica surface, for example silyl phosphonates, phosphonic acids, amines, alcohols, epoxides, carboxylic acids, thiols, thioethers, carbamates, isocyanates, quarternary ammonium ions, etc. The grafting process includes mixing the grafting agent with silica particles, with or without the solvent, with optional heating of the material, in the temperature range 25-150° C., more typically 60-130° C., still more typically 80-120° C., with or without the application of vacuum, in order to remove the volatile byproducts, like water or alcohols. In one embodiment of the disclosure, the hollow silica particles were functionalized with (diethoxyphosphoryl)methyl-2-((triethoxysilyl)ethyl) carbamate, introducing phosphonate functionality on the surface. In another embodiment of the invention, the silica particles were functionalized with diethyl [2-(triethoxysilyl)ethyl]phosphonate to generate phosphonate-functionalized silica particles. Then, in another embodiment, phosphonate ester functionality on the surface of the silica particles was hydrolyzed to generate phosphonic acid-functionalized hollow silica particles. In another embodiment of the disclosure, silica particles were treated with (3-glycidopropyl)trimethoxysilane, to generate epoxy functionality on the silica surface. The epoxy silica was then treated, in one embodiment of the disclosure, with glycine, to introduce carboxylic acid functionality through an amine linkage on the particle. In another, the epoxy silica was treated with thioglycolic acid to introduce the carboxylic functionality through a thioether group.

Polyermic/Silica Hybrid Hollow Nanosphere Particles Used as Binding Particles

Polymeric silica hybrid hollow particles may be used as binding particles of the present invention and are made by a process comprising: a) providing a mixture comprising water, at least one non-reactive solvent, at least one acrylic or styrenic monomer; at least one functionalized acrylic or styrenic monomer; an initiator; at least one surfactant; and, optionally, a polymerizable silane if the polymeric/silica hybrid hollow particles are desired; b) shearing the components of the mixture from (a) with high shear energy at an energy density of at least $10^6$ J/m$^3$ to form a mini-emulsion; and (c) heating to at least about 50° C., more typically about 50° C. to about 90° C.; and still more typically about 60° C. to about 80° C. to form, in one step, a surface functionalized polymeric or polymeric/silica hybrid hollow nanosphere.

The non-reactive solvent may be an alkane, a hydrocarbon oil, aromatic hydrocarbon or halogenated hydrocarbon liquid, more typically alkane or hydrocarbon oil.

The at least one acrylic or styrenic monomer may be methyl methacrylate, methyl acrylate, n-butyl methacrylate, t-butyl methacrylate, t-butyl acrylate, ethyl glycol dimechacrylate, styrene or divinylbenzene; more typically methyl methacrylate or styrene. The monomer is present in the amount of about 5 wt % to about 30 wt %, more typically about 5 wt % to about 20 wt %, based on the total weight of all components.

The at least one functionalized acrylic or styrenic monomer may be a monomer having one of the following formulas:

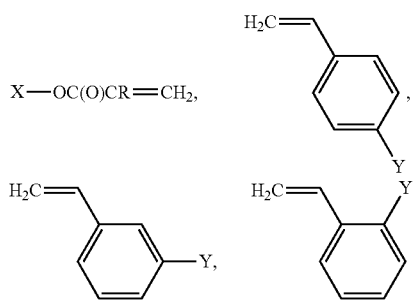

wherein R═H or CH$_3$, and X and Y are the functional groups that can be introduced onto the hollow particle surface. A large spectrum of functionalities can be used, for example boronic acid, sulfonic acid, silyl phosphonates, phosphonic acids, amines, alcohols, epoxides, carboxylic acids, thiols, thioethers, carbamates, isocyanates, quarternary ammonium ions. Some suitable functionalized acrylic or styrenic monomers are glycidyl methacrylate, phosphoric acid 2-hydroxyethyl methacrylate ester, 4-vinylbenzenephosphonic acid, 4-vinylbenzeneboronic acid, 4-vinylbenzene sulfonic acid and salts or esters. Depending on the hydrophobicity of the functionalized acrylic or styrenic monomer, the functional groups can be located in the either inner or outer surface of the hollow spheres. The functionalized acrylic or styrenic monomer is present in the amount of about 0.1 wt % to about 20 wt %, more typically about 1 wt % to about 12 wt %, still more typically about 2 wt % to about 8 wt % based on the total weight of all monomers.

Some suitable initiators include azo compounds such as 2,2'-azobisisobutyronitrile (AIBN) or 2,2'-azobis(2-methylpropionamide) dihydrochloride (AIBA); metal persulfate such as potassium persulfate (KPS) or sodium persulfate; more typically AIBN or KPS. The initiator is present in the amount of about 0.05 wt % to about 0.5 wt %, more typically about 0.1 wt % to about 0.3 wt %, based on the total weight of all components.

Some suitable surfactants include cetyltrimethylammonium bromide (CTAB), lauryltrimethylammonium bromide, dodecyltrimethylammonium bromide, octyltrimethylammonium bromide, sodium dodecyl sulfate (SDS), sodium dodecylbenzene sulfonate (SDBS), dioctylsulfosuccinate, non-ionic surfactants such as alkylphenol polyoxyethylene, polyoxyethylene glycol alkyl ethers, polyoxypropylene glycol alkyl ethers, octylphenol ethoxylates, or poloxamers, more typically SDS, SDBS or CTAB. Some useful commercially available surfactants series include Triton X® manufactured by The Dow Chemical Company, Brij® manufactured by Croda International PLC, or Pluoronic® manufactured by BASF. The surfactant concentration is about 0.001 wt % to about 5 wt %, more typically about 0.1 wt % to about 2 wt %, based on the total weight of all components.

Optionally, a polymerizable silane may be needed if the polymeric/silica hybrid hollow particles are desired. Some suitable polymerizable silanes are allyltriethoxysilane, allyltrimethoxysilane, diethoxy(methyl)vinylsilane, dimethoxymethylvinylsilane, triethoxyvinylsilane, trimethoxy(7-octen-1-yl)silane, 3-(trimethoxysilyl)-propyl acrylate, 3-(trimethoxysilyl)propyl methacrylate, or vinyltrimethoxysilane, more typically 3-(trimethoxysilyl)propyl acrylate or 3-(trimethoxysilyl)propyl methacrylate.

The monomers to non-reactive solvent ratio is about 0.1 to about 6, more typically about 0.5 to about 3, still more typically about 0.5 to about 2; oil to water ratio is about 0.01 to 0.3, more typically 0.05 to 0.2; and surfactant concentration is about 0.001 wt % to about 5 wt %, more typically 0.1 wt % to about 2 wt %, based on the total weight of all components. It is important because the combination of monomers to non-reactive solvent ratio, oil to water ratio and surfactant level determine the particle size, hollow or non-hollow particle structure, and the shell thickness.

The mixture in step (a) may be prepared in any glass container or stainless steel reaction vessel.

The mixture of the above components is then sheared at an energy density of at least $10^6$ J/m$^3$, more typically about $10^7$ J/m$^3$ to about $5*10^8$ J/m$^3$, to form a mini-emulsion. Some useful means for shearing include an ultrasonic disruptor, high speed blender, high pressure homogenizer, high shear disperser, membrane homogenizer or colloid mill, more typically an ultrasonic disruptor, high speed blender, or a high pressure homogenizer. Typically shearing occurs for a period of about 5 to about 120 minutes depending on amount of emulsion needed to be prepared and desired emulsion size range, more typically about 30 minutes to about 60 minutes. Typically, shearing is accomplished at room temperature. Optionally, a defoamer may be needed to avoid foaming during emulsifying. Some suitable defoamers include BASF Foamaster®, Dow Corning® 71 and 74 Antifoams.

The mini-emulsion formed in step (b) is then heated to at least about 50° C., more typically about 50° C. to about 90° C.; and still more typically about 60° C. to about 80° C. to form, in one step, a surface functionalized polymeric or polymeric/silica hybrid hollow nanosphere. Heating may be accomplished using hot plate, heating mantle or any other heating method.

Spacers

Organization and spacing of the IIS is tailored via a spacer that includes one or more pH responsive groups. Spacers may include ligands, oligomers, or polymers whose chemical composition includes the pH responsive groups. Spacers may have a molecular weight in the range of 10 g/mol to 10 million g/mol, preferably in the range of 10 g/mol to 5 million g/mol, more preferable in the range of 10 g/mol to 1 million g/mole, even more preferable in the range of 10 g/mol to 500,000 g/mole. In addition, a spacer may simply be a pH responsive group. Spacers may be on the surface of a binding particle or be inherent to the composition of a binding particle. The pH responsive groups are chosen to specifically react with target sites such as secondary functional groups located on, or implicit to, one or more pre-IIS component(s), preferably inorganic particles, most preferably TiO2 particles. It is preferable that pre-IIS components binding to one or more binding particles have target sites on their surface but do not including pH responsive groups. It is most preferred that robust chemical bonds are formed between the one or more pH responsive groups (i.e. on one or more binding particles) and one or more target site (i.e. on one or more pre-IIS components) for purposes of creating defined spacing and robust attachment between one or more pre-IIS component, (preferably inorganic particles, more specifically titanium dioxide) and one or more binding particles. Examples of spacers include: epoxides ring opened with thiols/amines/carboxylic acids/alcohols, formation of amides, esters, urethanes, ureas, thiol-ene, azide-alkyne reactions, phosphonic/sulfonic/boronic/carboxylic/hydroxamic acids in concert with hydroxyl groups, condensation reactions between hydroxyl groups and silanes to form siloxanes, and noble metal (e.g. gold)-thiol bonding systems. Examples of monomers employed in the synthesis of spacers include, but are not limited to, styrene, n-butyl methacrylate, methyl methacrylate, methacrylic acid, ethylene, propylene, ethylene oxide, glycidyl methacrylate, 3-(trimethoxysilyl)propyl methacrylate, phosphoric acid 2-hydroxyethyl methacrylate ester, 4-vinylbenzenephosphonic acid, 4-vinylbenzeneboronic acid, 4-vinylbenzene sulfonic acid, their salts or esters or a combination thereof.

pH Responsive Groups

Spacers either include pH responsive groups or are pH responsive groups. One or more pH responsive groups may be present at the terminus/termini of a spacer, such as a ligand or polymer (i.e. telechelic), in each repeat unit of a spacer such as homopolymer, in a fraction of the repeat units of a spacer such as a copolymer or terpolymer, in the backbone of the spacer, such as a polymer, or as a component of a graft or branch extending from the backbone of a spacer or polymer. pH responsive groups are chosen to specifically react with secondary functional groups (or target sites) located on or implicit to the composition of pre-IIS components, specifically inorganic particles, preferably $TiO_2$ to form robust chemical bonds, preferably covalent bonds.

pH sensitive groups employed in the present invention include, but are not limited to, forming dynamically covalent bonds, specifically those that are labile with respect to changes in pH. One example is one or more binding particles selected from the group consisting of inorganic particles, hollow inorganic particles, hollow polymer particles, and solid polymer particles wherein the binding particle has one or more pH responsive groups on its surface bearing pH responsive groups such as boronic acids that form boronate esters in the presence of 1-2 or 1-3 diols (Rowan et al., Angew. Chem. Int. Ed. 2002, 41, 989-952.). However, this type of acid alcohol condensation to form an ester is also common for and would be applicable but not limited to the case of phosphonic acids, sulfonic acids, and carboxylic acids. The initial functional group present on the surface of the particles may also be the ester, which may be selectively hydrolyzed to the acid at targeted pH to free the acid for attachment to a separate component surface such as $TiO_2$ pigment or another particle bearing a complimentary functional group on a ligand or polymer that is able to react to form a robust chemical bond. Suitable pH responsive groups include but are not limited to methacrylic acid, itaconic acid, 2-(methacryloxy)ethyltrimethylammonium chloride 2-aminoethylmethacrylate, diethylaminoethyl methacrylate, diisopropylaminoethyl methacrylate, dimethylaminoethyl methacrylate, 1-vinyl-2-pyrolidinone, 4-vinylpyridine, vinylbenzyltrimethylammonium chloride, phosphoric acid 2-hydroxyethyl methacrylate, vinylphosphonic acid, 4-vinylbenzenephosphonic acid, 3-sulfopropyl methacrylate, vinylsulfonic acid, 4-vinylbenzylsulfonic acid, vinylboronic acid, 4-vinylbenzeneboronic acid, 1-phenylvinylboronic acid, but-3-enylboronic acid, pent-3-enylboronic acid, hex-3-enylboronic acid, their corresponding salts, and the corresponding esters of the acids.

Pre-IIS Components Bind with Binding Particles

Binding particles may bind to other pre-IIS components such as inorganic particles. It is preferred that binding particles bind to other pre-IIS components that do not have pH responsive groups on their surface. Solid or hollow inorganic particles not having pH sensitive groups attached to their surface, such as hollow $SiO_2$ particles or $TiO_2$ pigment, may act as a pre-IIS components and preferably be added to a composition including binding particles for the purpose of creating chemical bonds, such as covalent bonds, between the pre-IIS components to form an IIS. Inorganic particles, such as hollow $SiO_2$ particles or $TiO_2$ pigment, may also act as binding particles. In order for one or more solid or hollow inorganic particles to act as binding particles, the surface of the inorganic particle must be treated so that the inorganic particle surface includes a spacer and/or pH responsive group.

By "titanium dioxide particles or $TiO_2$" we mean pigmentary sized titanium dioxide particles of average size which may or may not have organic or inorganic surface treatments. The particles described herein are between about a 100 to about 900 nm in size, more typically between about 150 and about 600 nm, and still more typically between about 180 and about 270 nm. Note that the invention further extends specifically to inorganic particles with relation to their chemical composition, including but not limited to oxides of P, B, S, Bi, Si, Al, Zr, Pb, available surface area, number of available binding sites, and spatial surface organization. This aspect of the invention allows for pH dependent binding of the ligand/polymer (particles) directly with a designed inorganic surface as opposed to a complimentary organic entity already present on the inorganic surface. Patterning of the inorganic surface via processing to control areal chemistry or inert shielding is also included to aid in organizing the paint components and mediating the number of possible binding interactions between binding particles and inorganic surfaces on the pigment.

The inorganic pigments, particularly the titanium dioxide pigments may be used alone or in combination with conventional colorants. Any conventional colorant such as a pigment, dye or a dispersed dye may be used in this disclosure to impart color to the coating composition. In one embodiment, generally, about 0.1% to about 40% by weight of conventional pigments, based on the total weight of the component solids, can be added. More typically, about 0.1% to about 25% by weight of conventional pigments, based on the total weight of component solids, can be added.

In particular, titanium dioxide is an especially useful powder in the products of this disclosure. Titanium dioxide ($TiO_2$) powder useful in the present disclosure may be in the rutile or anatase crystalline form, more typically in predominantly rutile form, i.e., comprising at least 50% rutile. It is commonly made by either a chloride process or a sulfate process. In the chloride process, $TiCl_4$ is oxidized to $TiO_2$ powders. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference. The powder may be pigmentary, nano or ultrafine particles. Pigmentary refers to median primary particles in the size range typically about 200 nm to about 450 nm, and nano refers to median primary particles in the size range typically less than 50 nm.

Conventional pigments are generally well known pigments and they may be used alone or in mixtures thereof in coating formulations of the disclosure. Suitable pigments are disclosed in Pigment Handbook, T. C. Patton, Ed., Wiley-Interscience, New York, 1973. Any of the conventional pigments used in coating compositions can be utilized in these compositions such as the following: metallic oxides, such as titanium dioxide, zinc oxide, and iron oxide, metal hydroxide, metal flakes, such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired chromate-free pigments, such as barium metaborate, zinc phosphate, aluminum triphosphate and mixtures thereof, can also be used.

Solid inorganic particles may participate in chemical bonds through the network of metal oxide and metal hydroxide bonds present on their surface. The solid inorganic particles may also display binding functionalities on their surface due to prior reaction or association with ligands/polymers bearing the functional groups of interest.

One type of binding particle used in the present invention is/are hollow particles. By "hollow particle" we mean a particle with a discernible density difference between the core and the shell materials of at least 0.2 g/cm$^3$ in the dry paint film, or a precursor layered material that results in this density difference in the final paint film where the core material represents about 20 to about 90%, typically 30 to 80%, and more typically 40 to 75% of the total particle volume.

Definition of Attached, Physical Bond, Chemical Bond

By "attached" we mean the binding particle(s) are attracted to the $TiO_2$ particle such that they at least partially coat the surface of the $TiO_2$ particle thereby separating it from adjacent $TiO_2$ particles in a crowded system. This attachment can be through chemical bonds (chemically bound) and additionally through supplementary attractive physical forces (physically bound). However, we do not consider inorganic particles, such as $TiO_2$ particles, that are only "physically bound" to binding particles to be "attached".

A physical bond tends to be weaker, less robust, longer distance, and less selective than a chemical bond. A physical bond is a bond mediated by physical forces, specifically electrostatic (Coulomb) and dispersion (Van der Waals) interactions. Physical bonds include ionic bonds, dipole-dipole interactions, hydrogen bonds, ion-dipole interactions, ion-induced dipole interactions, dipole-induced dipole interactions, and dispersion (Van der Waals) interactions. Examples of physical bonds include the interaction between metal cations and halide anions in salt (ionic) and the interaction of methanol with chloroform (dipole-dipole). The interaction between the polar/charged surface of a $TiO_2$ pigment and the uncharged polymeric particle in U.S. Pat. No. 7,288,146 is an example of ion-induced dipole class of physical bonds. However, we do not consider $TiO_2$ particles that are only "physically bound" to hollow particles to be "attached," instead labeling these complexes as "associated." Physical bonds alone are herein considered insufficient for robust surface attachment that aids in preservation of the tailored complex during processing to produce a dry product and/or formulation to produce a coating with optimized hiding power.

Typically stronger and shorter range, chemical bonds result in the sharing of an electron pair between reactive partners. It is preferred that the binding particles form chemical bonds with the target sites on other pre-IIS components including metal oxide particles, preferably titanium oxide, to form an IIS. Chemical bonds here include covalent bonds which may be further classified as non-polar covalent, polar covalent, or coordinate covalent (i.e. dative) bonds. Non-polar and polar covalent bonds involve the sharing of electrons between atoms where one electron is contributed from each atom. Non-polar covalent bonds describe those bonds where there is limited difference in electronegativity between the bound atoms (e.g. C—C), whereas polar covalent bonds describe those bonds where the difference in electronegativity is substantial (e.g, C—O). Coordinate covalent bonds describe bonds where both electrons are contributed from a single atom (e.g. M$^+$-O$^-$ or B—NR$_3$).

Functionalization of the $TiO_2$ pigment, hollow inorganic particle, solid polymer particle, or hollow polymer particle with a spacer including a pH responsive functional group in its composition allows for attachment of the particles via bonds formed through condensation with an inherently available hydroxylated metal oxide surface, preferably on the surface of the $TiO_2$ pigment. Examples of functional groups useful for this mode of attachment include but are not limited to phosphonic acids, sulfonic acids, boronic acids and their corresponding salts. One example of chemical bonding is the incorporation of phosphate groups on the surface of the hollow particles so that they may, under appropriate conditions, interact with alumina species if present on the surface of an inorganically surface treated $TiO_2$ particle. A further example of a polar covalent bond useful for this mode of particle attachment is the Si—O bond formed by the condensation of silanes with hydroxylated surfaces. Another example of chemical bonding is the polar-covalent bond formed during the ring-opening of an epoxide with reactants including but not limited to thiols, amines, carboxylic acids, and alcohols. Placement of a separate reactant from the pair on the $TiO_2$ and the hollow particle results in attachment of the two particles post-reaction. Further examples of polar-covalent bonds useful for attachment of $TiO_2$ to hollow particles include but are not limited to amides, esters, urethanes, ureas, ethers and those bonds resulting from thiol-ene and azide-alkyne reactions. An example of this attachment scheme that proceeds through formation of a non-polar covalent bond would be functionalization with a diene and a dienophile to facilitate a Diels-Alder reaction, forming a cyclic C—C based linker.

Dispersions Include Pre-IIS Components

The present invention includes one or more methods of making aqueous dispersions of pre-Integrated Inorganic System components. Pre-IIS components, such as $TiO_2$ and binding particles are combined in water in a dilute state at a pH that prevents the formation of chemical bonds between pH responsive groups and target sites. In one aspect of the invention, binding particles are suspended in water, at neutral pH, to create a stable dispersion. The quality and stability of the dispersion may in some cases require use of sonication, mixing, or application of high shear. A similar dispersion of pigment, preferably $TiO_2$, is created with analogous methods and added to the binding particle dispersion. In a second aspect of the invention, binding particles are suspended in water, at neutral pH, to create a stable dispersion. The quality and stability of the dispersion may in some cases require use of sonication, mixing, or application of high shear. The binding particle dispersion is then added to an already formulated paint. The exact pH for the formation of a pre-IIS component dispersion is dependent on the pre-IIS components used, on the basis of both the pH sensitive functional group of the binding particle and the composition of the metal oxide surface which is typically hydroxylated. Modulation of the pH level allows for formation of chemical bonds between the target sits on one or more binding particles and one or more inorganic particles.

In the first aspect of the invention the above created pre-IIS component dispersion can then be dried. After formation of the complex the dispersion is dried, removing a fraction of the water, preferably 90%, more preferably 97%, even more preferably 98%, most preferably 100% of the water is removed. The dry complex may go through a further grinding step prior to incorporation into a coating formulation. In the second aspect of the invention the pre-IIS component dispersion is created when the binding particle dispersion is added to the common paint formulation. The complex is then formed during the drying step after the paint is applied to a surface to form a coating.

Formation of the chemical bond in aqueous or solvent-based dispersions is highly dependent on the composition of the molecule bearing the binding functional group of interest. Anhydrous conditions and/or removal of water accelerates formation of ester bonds in the case of acid/alcohol systems. Electron donating and withdrawing functional groups adjacent to the binding group will cause variations in the pKa of the binding group, thus determining the pH where chemical bonds are more likely to form. The target pH may also be modified based on the complimentary molecule involved in the binding event. As an example, phenylboronic acid typically has a pKa of 8.8. However, the pKa decreases to 6.5 and 4.5 during reaction with glucose and fructose respectively. (Boronic Acids, ed. By Dennis G. Hall, 2005).

The pre-IIS dispersion or pre-IIS powder can then be combined into a composition such as coating formulation, preferably a paint. As the pH of the paint changes from more to less basic, during evaporation of water and $NH_3$, the pH responsive groups on the spacers associated to binding particles undergo a chemical conversion that modifies their ability to react with respect to targeted sites on particles, preferably an inorganic pigment, most preferably titanium dioxide. Most aqueous paints exhibit a pH in the range of 8-10 when wet. The pH of a paint typically decreases during drying to a pH range of 6-7. It is preferred that pre-IIS components of the present invention form IIS at a pH in the range from 6 to 7. Benefits of the present invention include above pH 7, when a paint is still wet, the wet paint includes mostly pre-IIS components avoiding gelation or flocculation of the components when a paint is dry or too dilute. IIS are formed at a pH range of 6-7 resulting in enhance organization of pre-IIS components, designed spacing, homogeneous distribution of the components, and enhanced hiding power when a paint is dry. Depending upon the pre-IIS components used, the pH range in which pre-IIS components form IIS will also change.

Another embodiment of the present invention is to create a pre-Integrated Inorganic System Components 3 dispersion, that can be dried, handled, shipped, and then dispersed from a powdered form into a second composition such as paint. When paint comprising pre-Integrated Inorganic System Components dries and results in a pH change, an Integrated Inorganic System will form.

As the pH of the dispersion or paint changes, for instance from more to less basic during drying the functional groups undergo a conversion that modifies their binding ability with respect to a targeted surface (the surface of one or more inorganic particles or pigments, preferably $TiO_2$, not having pH functional groups on its surface) and formation of a chemical bond, preferably a covalent bond. The binding particles having pH sensitive functional groups on their surface will bind with the target sites, preferably when pH levels are in the range of 1-14, most preferably between a pH range of 6-9, and most preferably between 7-9.

Wet Coating Compositions Include Pre-IIS Components

It is preferred that the pre-IIS components are formulated into a paint and an IIS is formed when the paint dries and the pH of the paint is in the pH range of 6-10. An IIS and pre-IIS components may include binding particles including, but not limited to, pigment particles, latex binding particles, and organic or inorganic hollow binding particles.

Coating Composition:

This disclosure is particularly suitable for producing wet coating compositions, and in particular wet architectural paint formulations or wet ink formulations comprising pre-IIS components. Upon the drying of wet compositions an IIS is formed.

Coating Base:

The coating base comprises a dispersion of resin, functionalized hollow silica particles of this disclosure and further comprises a colorant. Other additives known to one skilled in the art may also be present.

Resin:

The resin is selected from the group consisting of water-dispersible coating compositions such as latex coating compositions; alkyd coating compositions; urethane coating compositions; and unsaturated polyester coating compositions; and mixture thereof. By "water-dispersible coatings" as used herein is meant surface coatings intended for the decoration or protection of a substrate, comprising essentially an emulsion, latex, or a suspension of a film-forming material dispersed in an aqueous phase, and typically comprising surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints. For latex paints the film forming material is a latex polymer of acrylic, styrene-acrylic, vinyl-acrylic, ethylene-vinyl acetate, vinyl acetate, alkyd, vinyl chloride, styrene-butadiene, vinyl versatate, vinyl acetate-maleate, or a mixture thereof. Such water-dispersed coating compositions are described by C. R. Martens in "Emulsion and Water-Soluble Paints and Coatings" (Reinhold Publishing Corporation, New York, N.Y., 1965). Tex-Cote® and Super-Cote®, Rhoplex®, Vinnapas® EF500 are further examples of water based coating compositions comprising 100% acrylic resin.

The alkyd resins may be complex branched and cross-linked polyesters having unsaturated aliphatic acid residues. Urethane resins typically comprise the reaction product of a polyisocyanate, usually toluene diisocyanate, and a polyhydric alcohol ester of drying oil acids.

The resin is present in the amount of about 5 to about 40% by weight based on the total weight of the coating composition. The amount of resin is varied depending on the amount of sheen finish desired.

Colorant:

The inorganic pigments, particularly the titanium dioxide pigments may be used alone or in combination with conventional colorants. Any conventional colorant such as a pigment, dye or a dispersed dye may be used in this disclosure to impart color to the coating composition. In one embodiment, generally, about 0.1% to about 40% by weight of conventional pigments, based on the total weight of the component solids, can be added. More typically, about 0.1% to about 25% by weight of conventional pigments, based on the total weight of component solids, can be added.

TiO$_2$ Pigment:

In particular, titanium dioxide is an especially useful powder in the products of this disclosure. Titanium dioxide (TiO$_2$) powder useful in the present disclosure may be in the rutile or anatase crystalline form, more typically in predominantly rutile form, i.e., comprising at least 50% rutile, more typically at least about 75% rutile. It is commonly made by either a chloride process or a sulfate process. In the chloride process, TiCl$_4$ is oxidized to TiO$_2$ powders. In the sulfate process, sulfuric acid and ore containing titanium are dissolved, and the resulting solution goes through a series of steps to yield TiO$_2$. Both the sulfate and chloride processes are described in greater detail in "The Pigment Handbook", Vol. 1, 2nd Ed., John Wiley & Sons, NY (1988), the teachings of which are incorporated herein by reference. The powder may be pigmentary, nano or ultrafine particles. Pigmentary refers to median primary particles in the size range typically about 200 nm to about 450 nm, and nano refers to median primary particles in the size range typically less than 50 nm.

Conventional pigments are generally well known pigments and they may be used alone or in mixtures thereof in coating formulations of the disclosure, Suitable pigments are disclosed in Pigment Handbook, T. C. Patton, Ed., Wiley-Interscience, New York, 1973. Any of the conventional pigments used in coating compositions can be utilized in these compositions such as the following: metallic oxides, such as titanium dioxide, zinc oxide, and iron oxide, metal hydroxide, metal flakes, such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired chromate-free pigments, such as barium metaborate, zinc phosphate, aluminum triphosphate and mixtures thereof, can also be used.

Other Additives

A wide variety of additives may be present in the coating compositions of this disclosure as necessary, desirable or conventional. These compositions can further comprise various conventional paint additives, such as dispersing aids, anti-settling aids, wetting aids, thickening agents, extenders, plasticizers, stabilizers, light stabilizers, antifoams, defoamers, catalysts, texture-improving agents and/or antiflocculating agents. Conventional paint additives are well known and are described, for example, in "C-209 Additives for Paints" by George Innes, February 1998, the disclosure of which is incorporated herein by reference. The amounts of such additives are routinely optimized by the ordinary skilled artisan so as to achieve desired properties in the wall paint, such as thickness, texture, handling, and fluidity.

Coating compositions of the present disclosure may comprise various rheology modifiers or rheology additives (such as Acrysol®), wetting agents, dispersants and/or co-dispersants, and microbicides and/or fungicides. To achieve enhanced weatherability, the present coating compositions may further comprise UV (ultra-violet) absorbers such as Tinuvin®.

Coating compositions of the present disclosure may further comprise ceramic or elastomeric substances, which are heat and/or infrared reflective, so as to provide additional heat reflective benefits.

Preparation of the Coating Composition and its Use:

The present disclosure provides a process for preparing a coating composition, such as a paint formulation, comprising mixing the pigment-containing components and functionalized hollow silica nanospheres or particles with the resin to form a coating base. Optionally a vehicle may be present. The vehicle may be aqueous or solvent based. Typically these coating compositions may comprise from about 30 to about 55% solids by weight and typically about 25% to about 45% solids by volume. Typically the coating compositions of this disclosure have a density of about 9.1 to about 11.9 pounds per gallon, more typically about 9.5 to about 10.8 pounds per gallon. Any mixing means known to one skilled in the art may be used to accomplish this mixing. An example of a mixing device includes a high speed Dispermat®, supplied by BYK-Gardner, Columbia, Md.

Coating compositions of the present disclosure may be applied by any means known to one skilled in the art, for example, by brush, roller, commercial grade airless sprayers, or electrostatically in a particle coating. Coating compositions presented herein may be applied as many times necessary so as to achieve sufficient coating on the coated surface, for example, an exterior wall. Typically, these coating compositions may be applied from about 2 mils to about 10 mils wet film thickness, which is equivalent to from about 1 to about 5 dry mils film thickness.

Coating compositions presented herein may be applied directly to surfaces or applied after surfaces are first coated with primers as known to one skilled in the art.

The coating compositions of this disclosure may be a paint, and the paint may be applied to a surface selected from the group consisting of building material, automobile part, sporting good, tenting fabric, tarpaulin, geo membrane, stadium seating, lawn furniture and roofing material.

The examples which follow, description of illustrative and typical embodiments of the present disclosure are not intended to limit the scope of the disclosure. Various modifications, alternative constructions and equivalents may be employed without departing from the true spirit and scope of the appended claims. In one embodiment, the coating films may be substantially free of other conventional colorants and contain solely the treated titanium dioxide pigments of this disclosure.

EXAMPLES

Glossary

PS polystyrene
PVBBA poly(4-vinylbenzene boronic acid)
SDBS sodium dodecylbenzene sulfonic acid
VBBA 4-vinylbenzene boronic acid
RT room temperature (~22° C.)
DLS dynamic light scattering
PVC pigment volume concentration
R-746 DuPont TiPure® TiO$_2$ pigment
PPHEMA poly(phosphoric acid 2-hydroxyethyl methacrylate)
PHEMA phosphoric acid 2-hydroxyethyl methacrylate
DSS dioctylsulfosuccinate sodium salt
PVBSA poly(4-vinylbenzene sulfonic acid)
VBSA 4-vinylbenzene sulfonic acid
PMAA poly(methacrylic acid)
MAA methacrylic acid
PnBMA poly(n-butyl methacrylate)
nBMA n-butyl methacrylate Comparative Example 1: Making Non-Coalescing Solid Polymer Particles without Spacers and pH Responsive Groups Solid polymer binding particles composed of 100 wt % PS were prepared at 15 wt % solids with a particle size of 73 nm via conventional emulsion polymerization methods. 70 g of water, 0.74 g of DSS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 29.8 g of styrene was added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to room temperature. Any resultant coagulum was removed with a filter prior to characterization of the dispersion's pH, weight percent solids, and particle size (DLS).

Example 1: Making Non-Coalescing Binding Particles with a Spacer Including Boronic Acid pH Responsive Groups Solid polymer binding particles composed of 92.5 wt % PS and 7.5 wt % PVBBA were prepared at 21 wt % solids with a particle size of 74 nm via conventional emulsion polymerization methods. 70 g of water, 0.59 g of SDBS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 2.24 g of VBBA dissolved in 15 g of acetone was mixed with 27.57 g of styrene and added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to room temperature. Any resultant coagulum was removed with a filter prior to characterization of the dispersion's pH, weight percent solids, and particle size (DLS). We have confirmed with characterization that the amount of pH responsive functional group present in the binding particles is proportional to the wt % in the feed during the polymerization. Here, the pH responsive group is a part of the comonomer that is reacted to form the polymer chain. Addition of this comonomer into the polymer backbone is random in placement with relation to the primary monomer (i.e. styrene). Organization of the chains within the emulsion droplet during the polymerization dictates the presence or absence of a fraction of the pH responsive groups at the polymer/water interface where they are available for binding reactions with other functional groups, preferably those on TiO2 pigment (i.e. hydroxyls).

Example 2: Making Non-Coalescing Binding Particles with Phosphonic Acid pH Responsive Groups Solid polymer binding particles composed of 92.5 wt % PS and 7.5 wt % PPHEMA were prepared at 19 wt % solids with a particle size of 103 nm via conventional emulsion polymerization methods. 70 g of water, 0.15 g of DSS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 2.24 g of PHEMA dissolved in 27.57 g of styrene were added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to RT. Any resultant coagulum was removed with a filter prior to characterization of the dispersion's pH, weight percent solids, and particle size (DLS).

Example 3: Making Non-Coalescing Binding Particles with Sulfonic Acid pH Responsive Groups Solid polymer binding particles composed of 92.5 wt % PS and 7.5 wt % PVBSA were prepared at 20 wt % solids with a particle size of 92 nm via conventional emulsion polymerization methods. 70 g of water, 2.24 g of DSS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 2.24 g of VBSA dissolved in 27.57 g of styrene were added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to RT. Any resultant coagulum was removed with a filter prior to characterization of the dispersion's pH, weight percent solids, and particle size (DLS).

Example 4: Making Non-Coalescing Binding Particles with Acrylic Acid pH Responsive Groups Solid polymer binding particles composed of 97.5 wt % PS and 2.5 wt % PMAA were prepared with a particle size of 90 nm via conventional emulsion polymerization methods. 70 g of water, 0.15 g of SDBS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 2.24 g of MAA dissolved in 27.57 g of styrene were added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to RT. Any resultant coagulum was removed with a filter prior to characterization of the dispersion's pH, weight percent solids, and particle size (DLS).

Example 5: Making Paint Formulations Including Non-Coalescing Pre-IIS Components Wet acrylic latex paint formulations were prepared as shown in Table 1 by combing binding particles prepared in comparative example 1 and examples 1-4 with TiO2, water and other components listed in Table 1. A total of six wet paint formulations were prepared including a "control" wet acrylic latex paint formulation containing no binding particles. Once the paint formulations were made and then dried into thin coating films, the thin coating films were analyzed and the hiding power of each thin film was determined via their scattering coefficient ($S_{coat}$) determined using standard protocols (Table 2). Paint formulations labeled Control 1 and Examples 1-4 contain approximately 5 wt % of binding particles in dry films formed upon the drying of each paint formulations. As seen in Table 2, the addition of non-coalescing pre-IIS components under standard conditions, not tailored to the pH responsive functional groups on the binding particles, does not provide films with superior hiding power as demonstrated by Examples 1-4 having lower scattering coefficient values than the control and non-functionalized comparative example.

TABLE 1

Composition (wet) of Paint Formulations.

| Material | Cont. 1 | Comp. 1 | Ex. 1 | Ex. 2 | Ex. 3 | Ex. 4 |
|---|---|---|---|---|---|---|
| Rutile TiO$_2$ slurry (76.5 wt % solids) | 30.84 | 30.84 | 30.84 | 30.84 | 30.84 | 30.84 |
| Acrylic emulsion (45.0 wt % solids) | 54.14 | 51.6 | 51.6 | 51.6 | 51.6 | 51.6 |
| Defoamer | 0.33 | 0.33 | 0.33 | 0.33 | 0.33 | 0.33 |
| Propylene glycol | 0.47 | 0.47 | 0.47 | 0.47 | 0.47 | 0.47 |
| Surfactant | 0.48 | 0.48 | 0.48 | 0.48 | 0.48 | 0.48 |
| Water | 8.81 | 8.81 | 8.81 | 8.81 | 8.81 | 8.81 |
| Biocide | 0.16 | 0.16 | 0.16 | 0.16 | 0.16 | 0.16 |
| Dispersant | 0.22 | 0.22 | 0.22 | 0.22 | 0.22 | 0.22 |
| Ammonia | 0.11 | 0.11 | 0.11 | 0.11 | 0.11 | 0.11 |
| Coalescent | 0.86 | 0.86 | 0.86 | 0.86 | 0.86 | 0.86 |
| Rheology modifier I (20.0 wt % solids) | 3.25 | 3.25 | 3.25 | 3.25 | 3.25 | 3.25 |
| Rheology modifier II (17.5 wt % solids) | 0.33 | 0.33 | 0.33 | 0.33 | 0.33 | 0.33 |
| Test material (100 wt % solids) | — | 2.54 | 2.54 | 2.54 | 2.54 | 2.54 |

TABLE 2

Hiding Power of Dried Thin Coatings

| Sample Notebook # | Example | Binding Particles | Optical Density | Scattering Coefficient |
|---|---|---|---|---|
| HG706 | Control 1 | none | 1.0000 | 1.0000 |
| D102574-203 | Comparative 1 | 100% PS | 0.9703 | 0.9903 |
| D102574-227 | 1 | 7.5% PVBBA | 0.9517 | 0.9816 |
| D102574-214 | 2 | 7.5% PHEMA | 0.6411 | 0.9342 |
| D102574-208 | 3 | 7.5% PVBSA | 0.9612 | 0.9181 |
| D102574-211 | 4 | 7.5% MAA | 0.9044 | 0.9993 |

Comparative Example 2: Making Coalescing Binding Particles without Spacer and pH Responsive Groups Solid polymer binding particles composed of 100 wt % PnBMA were prepared at 24 wt % solids with a particle size of 90 nm via conventional emulsion polymerization methods. 70 g of water, 0.3 g of SDBS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 29.81 g of nBMA was added to the reaction mixture with stirring at 80° C. and equilibrated for 10 min. 0.15 g of potassium persulfate in 5 g of water was added to the reaction mixture while the temperature was maintained at 80° C. The reaction proceeded with stirring for 3 h at 80° C. before removal of heat and equilibration to RT. Any resultant coagulum was removed with a filter prior to characterization of the dispersion's pH, weight percent solids, and particle size (DLS).

Example 6: Making Coalescing Binding Particles with Boronic Acid pH Responsive Groups Solid polymer binding particles composed of 92.5 wt % PnBMA and 7.5 wt % PVBBA were prepared at 31 wt % solids with a particle size of 78 nm via conventional emulsion polymerization methods. 240 g of pH 10 buffer and 9 g of SDBS were charged under nitrogen in a 500 mL resin kettle equipped with a triblade stirrer, thermocouple, and reflux condenser. The mixture was heated to 84° C. while stirring at 180 rpm and equilibrated for 10 min. A monomer emulsion was prepared with 13.56 g of VBBA dissolved in 60 g of acetone and 0.04 g of SDBS in a separate flask. 167.24 g of nBMA and 76 g of DI water were added sequentially to the monomer emulsion with stirring and allowed to form a cloudy dispersion over 30 min. 0.5 g of ammonium persulfate in 3 g of DI water was added to the reaction vessel while the temperature was maintained at 85° C. The monomer emulsion was added to the reaction vessel via peristaltic pump over 150 min. Simultaneously, 0.25 g of ammonium persulfate in 6.25 g of DI water was added to the reaction vessel via a separate peristaltic pump. After complete addition of the initiator and monomer emulsion feeds the reaction proceeded with stirring for 1 h at 85° C. before removal of heat and equilibration to RT. Any resultant coagulum was removed with a filter prior to characterization of the dispersion's pH, weight percent solids, and particle size (DLS). Prior to use in paint formulation the dispersion was concentrated to 41 wt % solids by removal of water under reduced pressure.

Example 7: Making Coalescing Binding Particles with Phosphonic Acid pH Responsive Groups Solid polymer binding particles composed of 92.5 wt % PnBMA and 7.5 wt % PPHEMA were prepared at 41 wt % solids with a particle size of 94 nm via conventional emulsion polymerization methods. 270 g of pH 10 buffer and 13.5 g of SDBS were charged under nitrogen in a 500 mL resin kettle equipped with a triblade stirrer, thermocouple, and reflux condenser. The mixture was heated to 84° C. while stirring at 180 rpm and equilibrated for 10 min. A monomer emulsion was prepared with 20.34 g of PHEMA dispersed in 105 g of water with 0.06 g of SDBS and 250.86 g of nBMA in a separate flask. 0.75 g of ammonium persulfate in 4.5 g of DI water was added to the reaction vessel while the temperature was maintained at 85° C. The monomer emulsion was added to the reaction vessel via peristaltic pump over 150 min. Simultaneously, 0.375 g of ammonium persulfate in 6.25 g of DI water was added to the reaction vessel via a separate peristaltic pump. After complete addition of the initiator and monomer emulsion feeds the reaction proceeded with stirring for 1 h at 85° C. before removal of heat and equilibration to RT. Any resultant coagulum was removed with a filter prior to characterization of the dispersion's pH, weight percent solids, and particle size (DLS).

Example 8: Making Coalescing Binding Particles with Sulfonic Acid pH Responsive Groups Solid polymer binding particles composed of 92.5 wt % PnBMA and 7.5 wt % PVBSA were prepared with a particle size of 77 nm via conventional emulsion polymerization methods. 240 g of pH 10 buffer and 9 g of SDBS were charged under nitrogen in a 500 mL resin kettle equipped with a triblade stirrer, thermocouple, and reflux condenser. The mixture was heated to 84° C. while stirring at 180 rpm and equilibrated for 10 min. A monomer emulsion was prepared with 13.56 g of VBSA dispersed in 76 g of water with 0.04 g of SDBS and 167.24 g of nBMA in a separate flask. 0.5 g of ammonium persulfate in 3 g of DI water was added to the reaction vessel while the temperature was maintained at 85° C. The monomer emulsion was added to the reaction vessel via peristaltic pump over 150 min. Simultaneously, 0.25 g of ammonium persulfate in 6.25 g of DI water was added to the reaction vessel via a separate peristaltic pump. After complete addition of the initiator and monomer emulsion feeds the reaction proceeded with stirring for 1 h at 85° C. before removal of heat and equilibration to RT. Any resultant coagulum was removed with a filter prior to characterization of the dispersion's pH, weight percent solids, and particle size (DLS). Prior to use in paint formulation the dispersion was concentrated to 41 wt % solids by removal of water under reduced pressure.

Example 9: Making Coalescing Binding Particles with Acrylic Acid pH Responsive Groups Solid polymer binding particles composed of 92.5 wt % PnBMA and 7.5 wt % MAA were prepared at 37 wt % solids with a particle size of 89 nm via conventional emulsion polymerization methods. 270 g of pH 10 buffer and 13.5 g of SDBS were charged under nitrogen in a 500 mL resin kettle equipped with a triblade stirrer, thermocouple, and reflux condenser. The mixture was heated to 84° C. while stirring at 180 rpm and equilibrated for 10 min. A monomer emulsion was prepared with 20.34 g of MAA dispersed in 105 g of water with 0.06 g of SDBS and 250.86 g of nBMA in a separate flask. 0.75 g of ammonium persulfate in 4.5 g of DI water was added to the reaction vessel while the temperature was maintained at 85° C. The monomer emulsion was added to the reaction vessel via peristaltic pump over 150 min. Simultaneously, 0.375 g of ammonium persulfate in 6.25 g of DI water was added to the reaction vessel via a separate peristaltic pump. After complete addition of the initiator and monomer emulsion feeds the reaction proceeded with stirring for 1 h at 85° C. before removal of heat and equilibration to RT. Any resultant coagulum was removed with a filter prior to characterization of the dispersion's pH, weight percent solids, and particle size (DLS).

Example 10: Making Paint Formulations Including Coalescing Pre-IIS Components

The coalescing polymer binding particles shown in the examples above were tested in an acrylic latex paint formulation. Six formulations were prepared (Table 3), one without any binding spacers (Control 2), one with ~5 wt % of material from Comparative Example 2, and four with ~5 wt % of materials from Examples 6 through 9 respectively in the final dry film. Thin coating films were made from the six formulations and were compared for hiding power via the scattering coefficient (Swat) as determined with standard protocols (Table 4). It is evident that addition of certain coalescing polymer binding particles provides films with superior hiding power. The coalescing polymer binding particles described above are thus seen as good additives for hiding power improvement.

TABLE 3

Composition (wet) of Paint Formulations.

| Material | Cont. 2 | Comp. 2 | Ex. 6 | Ex. 7 | Ex. 8 | Ex. 9 |
| --- | --- | --- | --- | --- | --- | --- |
| Rutile TiO$_2$ slurry (76.5 wt % solids) | 30.84 | 30.84 | 30.84 | 30.84 | 30.84 | 30.84 |
| Acrylic emulsion (45.0 wt % solids) | 54.14 | 51.6 | 51.6 | 51.6 | 51.6 | 51.6 |
| Defoamer | 0.33 | 0.33 | 0.33 | 0.33 | 0.33 | 0.33 |
| Propylene glycol | 0.47 | 0.47 | 0.47 | 0.47 | 0.47 | 0.47 |
| Surfactant | 0.48 | 0.48 | 0.48 | 0.48 | 0.48 | 0.48 |
| Water | 8.81 | 8.81 | 8.81 | 8.81 | 8.81 | 8.81 |
| Biocide | 0.16 | 0.16 | 0.16 | 0.16 | 0.16 | 0.16 |
| Dispersant | 0.22 | 0.22 | 0.22 | 0.22 | 0.22 | 0.22 |
| Ammonia | 0.11 | 0.11 | 0.11 | 0.11 | 0.11 | 0.11 |
| Coalescent | 0.86 | 0.86 | 0.86 | 0.86 | 0.86 | 0.86 |
| Rheology modifier I (20.0 wt % solids) | 3.25 | 3.25 | 3.25 | 3.25 | 3.25 | 3.25 |
| Rheology modifier II (17.5 wt % solids) | 0.33 | 0.33 | 0.33 | 0.33 | 0.33 | 0.33 |

TABLE 3-continued

Composition (wet) of Paint Formulations.

| Material | Cont. 2 | Comp. 2 | Ex. 6 | Ex. 7 | Ex. 8 | Ex. 9 |
|---|---|---|---|---|---|---|
| Test material (100 wt % solids) | — | 2.54 | 2.54 | 2.54 | 2.54 | 2.54 |

TABLE 4

Hiding Power of Dried Thin Coatings

| Sample Notebook # | Example | Binding Particles | Normalized Optical Density | Normalized Scattering Coefficient |
|---|---|---|---|---|
| HG706 | Control 2 | none | 1.0000 | 1.0000 |
| D102574-272 | Comparative 2 | 100% PnBA | 0.9608 | 1.0032 |
| D102574-181 & D102574-143 | 6 | 7.5% PVBBA | 0.9977 0.9977 | 1.0256 0.9848 |
| D102574-153 & D102574-140 | 7 | 7.5% PHEMA | 1.0343 0.9819 | 0.9805 0.9741 |
| D102574-179 & D102574-145 | 8 | 7.5% PVBSA | 0.9903 0.9956 | 1.0019 0.9511 |
| D102574-159 & D102574-138 | 9 | 7.5% MAA | 0.9763 0.9898 | 0.9940 0.9828 |

Example 11: Making Post-IIS with Non-Coalescing Solid Polymer Particles with PHEMA pH Responsive Group Prior to Incorporation into the Paint Solid polymer binding particles composed of 97.5 wt % PS and 2.5 wt % PHEMA were prepared at 18 wt % solids with a particle size of 94 nm via conventional emulsion polymerization methods. 70 g of water, 0.08 g of DOSS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 29.06 g of styrene and 0.75 g of PHEMA were added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to room temperature. Any resultant coagulum was removed with a filter prior to characterization of the dispersion's pH, weight percent solids, and particle size (DLS).

In order to form the IIS prior to mixing with the paint, 40 g of dry pigment and 33 g of water were added to 54 g of the 18 wt % PHEMA-PS solution. This mixture was sonicated for 1 hr and then agitated for approximately 16 hr. To this mixture was added an additional 33 g of water and sonicated for 10 min.

Example 12: Making Post-IIS with Non-Coalescing Solid Polymer Particles with 4-Vinyl Pyridine pH Responsive Group Prior to Incorporation into the Paint Solid polymer binding particles composed of 92.5 wt % PS and 7.5 wt % 4-vinyl pyridine (4-VP) were prepared at 22 wt % solids with a particle size of 117 nm via conventional emulsion polymerization methods. 70 g of water, 0.15 g of SDBS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 27.58 g of styrene and 2.24 g of 4-vinyl pyridine were added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to room temperature. Any resultant coagulum was removed with a filter prior to characterization of the dispersion's pH, weight percent solids, and particle size (DLS).

In order to form the IIS prior to mixing with the paint, 40 g of dry pigment and 37 g of water were added to 46 g of the 22 wt % PHEMA-PS solution. This mixture was sonicated for 1 hr and then agitated for approximately 16 hr. To this mixture was added an additional 37 g of water and sonicated for 10 min.

Comparative Example 13: Mixing Non-Coalescing Solid Polymer Particles without Spacers and pH Responsive Groups with Pigment Prior to Incorporation into the Paint Solid polymer binding particles composed of 100 wt % PS were prepared at 26 wt % solids with a particle size of 93 nm via conventional emulsion polymerization methods. 70 g of water, 0.74 g of DSS, and 0.13 g of sodium bicarbonate were charged under nitrogen in a 500 mL resin kettle equipped with a triblade stirrer, thermocouple, and reflux condenser. The mixture was heated to 80° C. while stirring at 180 rpm and equilibrated for 10 min. 29.8 g of styrene was added to the reaction mixture with stirring at 80° C. and equilibrated for 10 min. 0.12 g of potassium persulfate in 5 g of water was added to the reaction mixture while the temperature was maintained at 80° C. The reaction proceeded with stirring for 3 h at 80° C. before removal of heat and equilibration to room temperature. Any resultant coagulum was removed with a filter prior to characterization of the dispersion's pH, weight percent solids, and particle size (DLS).

As a comparison with examples 11 and 12, the non-functionalized PS was contacted with pigment before being mixed into the paint. 40 g of dry pigment and 40 g of water were added to 39 g of the 26 wt % PS solution. This mixture was sonicated for 1 hr and then agitated for approximately 16 hr. To this mixture was added an additional 40 g of water and sonicated for 10 min.

Example 14: Making Paint Formulations Including Post-IIS Formed Components

The post-IIS solutions of the non-coalescing polymer binding particles shown in the examples 11-13 were blending into an acrylic latex paint formulation. Four formulations were prepared (Table 5), one without any binding spacers (Control 3), one where the polystyrene has ~2.5 wt % PHEMA described in Example 11, one with ~7.5 wt % 4-VP described in Example 12, and one where the polystyrene does not contain any functional groups described in Example 13. Thin coating films were made from the four formulations and were compared for hiding power via the scattering coefficient ($S_{coat}$) as determined with standard protocols (Table 6). It is evident that forming an integrated inorganic system between the TiO2 and functionalized non-coalescing polymer particle before addition to a paint formulation provides films with superior hiding power (Ex 12 and 13) as compared to non-functionalized particles (Ex 11). The process of contacting functionalized non-coalescing polymer binding particles with TiO2 before incorporation into the paint described above is thus seen as advantageous for hiding power improvement.

TABLE 5

Composition (wet) of Paint Formulations.

| Material | Cont. 3 | Ex. 11 | Ex. 12 | Ex. 13 |
|---|---|---|---|---|
| Rutile TiO$_2$ slurry (76.5 wt % solids) | 29.92 | 0.00 | 0.00 | 0.00 |
| Acrylic emulsion (45.0 wt % solids) | 55.22 | 30.57 | 30.57 | 30.57 |
| Defoamer | 0.35 | 0.19 | 0.19 | 0.19 |
| Propylene glycol | 0.50 | 0.28 | 0.28 | 0.28 |
| Surfactant | 0.51 | 0.28 | 0.28 | 0.28 |
| Water | 8.20 | 1.08 | 1.08 | 1.08 |
| Biocide | 0.18 | 0.10 | 0.10 | 0.10 |
| Dispersant | 0.23 | 0.13 | 0.13 | 0.13 |
| Ammonia | 0.12 | 0.07 | 0.07 | 0.07 |
| Coalescent | 0.92 | 0.51 | 0.51 | 0.51 |
| Rheology modifier I (20.0 wt % solids) | 3.50 | 1.94 | 1.94 | 1.94 |
| Rheology modifier II (17.5 wt % solids) | 0.35 | 0.19 | 0.19 | 0.19 |
| Test material (Solutions) | — | 64.66 | 64.66 | 64.66 |

TABLE 6

Hiding Power of Dried Thin Coatings

| Example | Binding Particles | Normalized Optical Density | Normalized Scattering Coefficient |
|---|---|---|---|
| Control 3 | none | 1.0000 | 1.0000 |
| 11 | PS functionalized with 2.5% PHEMA | 0.953 | 1.085 |
| 12 | PS functionalized with 7.5% 4-VP | 0.779 | 1.133 |
| 13 | Non-functionalized PS | 0.640 | 0.957 |

Example 15: Polystyrene Template Particle Synthesis

To a 2 L four-neck round bottom flask, equipped with a mechanical stirrer, thermometer, a reflux condenser, and a nitrogen inlet, was added styrene (18 mL, 157.1 mmol), and 600 mL of degassed water. Polyvinylpyrrolidinone, PVP (100 mg) solution in 100 mL of degassed water was then added. The resulting mixture was stirred at room temperature for 15 min. The mixture was degassed by bubbling nitrogen for 20 min. To the reaction was then added a degassed solution of 2,2-azobis(2-methylpropionamidine) hydrochloride, AIBA (100 mg, 1.1 mmol) in 100 mL water, and the reaction was heated to 70° C. overnight. Particle size analysis of the resulting suspension revealed particles with average particle size of 250 nm.

Example 16. Hollow Silica Particle Synthesis

To a 1 L Erlenmeyer flask was added 100 mL of PS suspension, followed by 700 mL of EtOH, and 20 mL of aq. NH$_4$OH. The flask was placed in a sonicating bath, to which was added 1 mL of TEOS via a syringe pump, at a 0.1 mL/min rate. The resulting suspension was left sonicating for 2 h, and ethanol was removed in vacuo. The resulting slurry was centrifuged, and washed with ethanol twice to yield a white solid. The resulting material was calcined in a tube furnace at 500° C. (r.t. –500 at 1° C./min, then 5 h at 500° C. Results are shown in Table 1.

Example 17. Grafting the HSP with Phosphonate Ester

Solid hollow particles (10 g) were dispersed in 300 mL dimethyl formamide (DMF). To this suspension was added a diethyl-(2-(triethoxysilyl)ethyl)phosphonate (10 mL, 31.0 mmol), and the mixture was heated to 120° C. overnight. The resulting material was centrifuged to remove the DMF solvent, and washed with ethanol. The presence of grafting groups was measured by TGA and ESCA.

Example 18. Phosphonic Acid-Functionalized Particles

To a 1 L round bottom flask, equipped with an addition funnel and a reflux condenser was added 25.6 g of phosphonate ester-functionalized particles (Example 12) and 400 mL dichloromethane, and the mixture was kept under nitrogen. To the mixture was added trimethylsilyl bromide (75 mL), dropwise, via an addition funnel. Upon addition, the mixture was heated to reflux for 18 h. The mixture was then cooled to room temperature and the volatiles removed in vacuo. To the residue was then added 150 mL of methanol, and 50 mL of dichloromethane, and the mixture was left stirring at room temperature overnight. The silica material was centrifuged to remove from the solvent and excess reagents (9,000 rpm for 20 minutes), and washed with water and methanol. ToF SIMS data confirmed the presence of phosphonic acid functionality, and disappearance of phosphonic ester functionality.

Example 19. Epoxide-Functionalized Hollow Silica Particles, Followed by Reaction with Glycine To a mixture of 10 mL of DMF and 500 uL of triethylamine (TEA) was added 38.5 mg of hollow silica particles (avg size ~250 nm), and the mixture was sonicated in an ultrasound (US) bath for ~15 min. The mixture became milky white, and 1 mL of (3-glycydoxypropyl)trimethoxysilane was added, and the mixture heated to 120° C. After three more hours, the mixture was cooled to r.t., and 24 mg glycine in 200 uL of water was added to the mixture, which was left stirring overnight. The sample was isolated by centrifuging and washing the solids with ethanol twice, and drying the solids. The material was analyzed by ESCA to confirm the presence of nitrogen atoms on the silica surface.

Example 20. Epoxide-Functionalized Hollow Silica Particles, Followed by Reaction with Thioglycolic Acid To 10 mL of DMF was added 36.5 mg of hollow silica particles (avg size ~250 nm), and the mixture was sonicated in a US bath for ~15 min. To the mixture was added 1 mL of (3-glycydoxypropyl)trimethoxysilane, and the mixture was heated to 120° C. overnight. The mixture was cooled to r.t., and, 500 µL of thioglycolic acid was added, and the mixture left stirring for two days. The sample was isolated by centrifuging and washing the solids with ethanol twice, and drying the solids. The material was analyzed by ESCA to confirm the presence of sulfur atoms on the silica surface.

Example 21: Hollow Silica Synthesis Via Interfacial Miniemulsion Method

An oily mixture which contained 4.2 g of hexadecane, 16.8 g of octane, and 21.0 g of TEOS was first prepared, and added to a water solution which contains 420.0 g of water, 4.2 g of CTAB and 0.5 g of defoamer (Foamaster® 111, BASF). Miniemulsification was achieved by shearing the mixture for 30 minutes with a high speed blender at 9500 rpm. After forming a stable miniemulsion, the polymerization was completed by letting the solution sit at room temperature for at least 12 hours. The structure of the resulting particles was analyzed using transmission electron microscopy and shown in FIG. 8. The average particle size of the resulting hollow particles determined by dynamic light scattering is 97 nm with a polydispersity of 0.152. The non-reactive solvents and water was then removed by filtration followed by distillation at 80° C. to form ~25 g of dry hollow silica.

Example 22: Grafting the Hollow Silica with Phosphonate Ester

Solid hollow silica particles (25 g) generated from example 7 were dispersed in 125 mL dimethyl formamide (DMF). To this suspension was added a diethyl-(2-(triethoxysilyl)ethyl)phosphonate (25 mL, 77.5 mmol), and the mixture was heated to 120° C. overnight. The resulting material was centrifuged to remove the DMF solvent, and washed with ethanol.

Example 23: Synthesis of Hollow Polymer with Boronic Acid Functional Groups

An oily mixture which contained 5.0 g of hexadecane, 36.8 g of octane, 28.8 g of methyl methacrylate, 3.6 g of ethylene glycol dimethacrylate, 3.6 g of styrene, 1.8 g of 4-vinylbenzene boronic acid and 0.798 g of AIBN was first prepared, and added to a water solution which contains 420.0 g of water, 0.9 g of CTAB and 0.5 g of defoamer (Foamaster® 111, BASF). Miniemulsification was achieved by shearing the mixture for 30 minutes with a high speed blender at 9500 rpm. After forming a stable miniemulsion, the polymerization was started by heating to 70° C. for at least 16 hours. The structure of the resulting particles was analyzed using transmission electron microscopy and shown in FIG. 1. The average particle size of the resulting hollow particles determined by dynamic light scattering is 146.5 nm with a polydispersity of 0.168.

Example 24: Binding Between TiO2 Pigment and Hollow Polymer with Boronic Acid Functional Groups 3 wt % of Ti-Pure® R-706 solution was mixed with equal amount of 7.5 wt % solution of hollow polymer with boronic acid functional group (from Example 9) with the aid of sonication bath. Centrifugation was then performed to separate the free hollow polymers from the hollow polymer/$TiO_2$ composites. The TEM images (FIG. 2) of the hollow polymer/$TiO_2$ composites showed that there were number of hollow particles surrounding the $TiO_2$ pigment, suggesting a binding between $TiO_2$ and hollow polymers.

What is claimed is:

1. A process for making a pre-integrated inorganic system component dispersion comprising:
   a. Providing i) one or more binding particles selected from the group consisting of solid inorganic particles, hollow inorganic particles, or combinations thereof, wherein one or more binding particles has on its surface one or more spacers comprising one or more pH responsive groups, wherein the one or more pH responsive groups are selected from the group comprising sulfonic acids, phosphonic acids, carboxylic acids, amines, boronic acids, salts and esters thereof, or combinations thereof, ii) one or more second inorganic particles comprising one or more target sites, and a solvent; and
   b. Creating a dispersion comprising the one or more binding particles, the one or more second inorganic particles, and the water solvent at a first pH to prevent formation of chemical bonds between the one or more pH responsive groups and the one or more target sites.

2. The process of claim 1, wherein the solvent is water.

3. The process of claim 1 wherein the first pH is greater than 10.

4. The process of claim 1 wherein the first pH is less than 10.

5. The process of claim 1 where the solid inorganic particles or hollow inorganic particles further comprises multi-compartment silica, alumina, aluminum phosphate, zirconia, titania or combination thereof.

6. The process of claim 1 where the spacer further comprises vinyls, diols, amino alcohols, isocyanates, epoxides, thiols, alkynes, azides, silanes, siloxanes, amines, carboxylic acids, phosphonic acids, boronic acids, sulfonic acids carboxylic acids, and salts or esters thereof.

7. The process of claim 1 where the one or more binding particles are in the size range from 10-1000 nm in diameter.

8. The process of claim 1 where the number of the one or more binding particles to one or more second inorganic particles is between 1-1000.

9. The process of claim 1 wherein the one or more second inorganic particles are greater than 200 nm.

10. The process of claim 1 wherein the one or more second inorganic particles are less than 200 nm.

11. The process of claim 1 wherein the one or more second inorganic particles comprise $TiO_2$.

12. The process of claim 1 wherein the one or more second inorganic particles are solid.

13. The process of claim 1, wherein the one or more second inorganic particles are hollow.

14. The process of claim 1, further comprising the step of: forming an integrated inorganic system by changing the pH of the dispersion to a level sufficient to enable the formation of chemical bonds between the one or more binding groups and the one or more second inorganic particles.

15. A process for making an Integrated Inorganic system comprising:
   a. Providing i) one or more binding particles selected from the group consisting of solid inorganic particles, hollow inorganic particles, hollow polymer particles, or combinations thereof, wherein the one or more binding particle has on its surface one or more spacers including one or more pH responsive group, wherein the one or more pH responsive groups are selected from the group comprising sulfonic acids, phosphonic acids, carboxylic acids, amines, boronic acids, salts and esters thereof, or combinations thereof, ii) one or more second inorganic particles comprising one or more target sites, and solvent;
   b. Creating a dispersion comprising the one or more binding particles, the one or more second inorganic particles, and the solvent at a first pH to prevent the formation of chemical bonds between the one or more pH responsive groups and the one or more target sites; and
   c. Forming an integrated inorganic system by changing the pH of the dispersion to a second pH to enable the formation of chemical bonds between the one or more pH responsive groups and the one or more target sites.

16. The process of claim 14, wherein the solvent is water.

17. The process of claim 14 where the hollow polymer particles further comprises a multi-compartment acrylic polymer, styrenic, styrene-acrylic polymer, a vinyl ester polymer, or ethylene-vinyl ester polymer.

18. The process of claim 14 where the solid inorganic particles and hollow inorganic particles further comprises silica, alumina, aluminum phosphate, zirconia, titania or combination thereof.

19. The process of claim 14 where the spacer further comprises vinyls, diols, amino alcohols, isocyanates, epoxides, thiols, alkynes, azides, silanes, siloxanes, amines, carboxylic acids, phosphonic acids, boronic acids, sulfonic acids and salts or esters thereof.

20. The process of claim 14 where the one or more binding particles are in the size range from 10-1000 nm.

21. The process of claim 14 wherein the number of the one or more binding particles to the one or more second inorganic pigment particle are between 1-1000.

22. The process of claim 14 wherein the one or more second inorganic particles are greater than 200 nm.

23. The process of claim 14 wherein the one or more second inorganic particles are less than 200 nm.

24. The process of claim 14 wherein the one or more second inorganic particle comprise $TiO_2$.

25. The process of claim 14 wherein the one or more second inorganic particles are solid.

26. The process of claim 14, wherein the one or more second inorganic particles are hollow.

27. A process of forming an pre-Integrated Inorganic System component dispersion comprising:
   a. Providing i) one or more binding particles selected from the group consisting of hollow polymer particles, and wherein the binding particle has one or more spacers on its surface, wherein the one or more spacers comprise one or more pH response groups and the one or more pH responsive groups and the one or more pH responsive groups are selected from the group comprising sulfonic acids, phosphonic acids, carboxylic acids, amines, boronic acids, the corresponding salts and esters thereof, or combinations thereof, ii) one or more second inorganic particles comprising one or more target sites and iii) a solvent;
   b. Creating a dispersion comprising the one or more binding particles, the one or more second inorganic particles, and the solvent at a pH sufficient to prevent formation of chemical bonds between the functional groups and the second inorganic particles; and
   c. Forming a complex by changing the pH of the dispersion to a level sufficient to enable the formation of chemical bonds between the one or more binding particles and the one or more second inorganic particles.

28. A process of forming an pre-Integrated Inorganic System component dispersion comprising:
   a. Providing a) one or more binding particles selected from the group consisting, and solid polymer particles wherein the one or more binding particle has one or more spacers, wherein the one or more spacers comprise one or more pH response groups and the one or more pH responsive groups are selected from the group comprising sulfonic acid, amines, boronic acids, the corresponding salts and esters thereof, or combinations thereof, b) one or more second inorganic particles comprising one or more target sites, and a solvent;
   b. Creating a dispersion comprising the one or more binding particles, the one or more second inorganic particles, and the solvent at a pH sufficient to prevent formation of chemical bonds between the one or more binding particles and the one or more second inorganic particles; and
   c. Forming an integrated inorganic system by changing the pH of the dispersion to a level sufficient to enable the formation of chemical bonds between the one or more binding groups and the one or more second inorganic particles.

29. A process for making a pre-integrated inorganic system component dispersion comprising:
   a. Providing i) one or more binding particles selected from the group consisting of solid inorganic particles, hollow inorganic particles or combinations thereof, wherein the one or more binding particle has on its surface one or more spacers comprising one or more pH responsive groups, wherein the pH responsive groups are selected from the group comprising sulfonic acid, phosphonic esters acids, carboxylic acids, amines, epoxides, boronic acids, the corresponding salts and esters thereof, or combinations thereof, ii) one or more second inorganic particles comprising one or more target sites, and a solvent; and
   b. Creating a dispersion comprising the binding particles, the second inorganic particles, and the water at a first pH to prevent formation of chemical bonds between the pH responsive groups and the target sites;
   c. Drying the dispersion to form a dry powder including the complex.

30. A process for making a pre-integrated inorganic system component dispersion comprising:
   a. Providing i) one or more binding particles selected from the group consisting of solid inorganic particles, hollow inorganic particles, or combinations thereof, wherein the one or more binding particle has on its surface one or more spacers comprising one or more pH responsive groups, wherein the pH responsive groups are selected from the group comprising sulfonic acids, phosphonic esters, carboxylic acids, amines, epoxides, boronic acids, the corresponding salts and esters thereof, or combinations thereof, ii) one or more second inorganic particles comprising one or more target sites, and a solvent;
b. creating a dispersion comprising the one or more binding particles, the one or more second inorganic particles, and the solvent at a first pH to prevent formation of chemical bonds between the pH responsive groups and the target sites; and
c. drying the dispersion to form a dry powder.

31. The process of claim 26, further comprising the step of: adding the dry powder into a coating formulation.

32. The process of claim 27, wherein the coating formulation is paint.

* * * * *